(12) United States Patent
Tsukitani et al.

(10) Patent No.: US 6,684,017 B1
(45) Date of Patent: Jan. 27, 2004

(54) OPTICAL TRANSMISSION LINE AND OPTICAL TRANSMISSION SYSTEM INCLUDING THE SAME

(75) Inventors: Masao Tsukitani, Yokohama (JP); Eisuke Sasaoka, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/273,360

(22) Filed: Oct. 18, 2002

Related U.S. Application Data

(63) Continuation-in-part of application No. 09/792,059, filed on Feb. 26, 2001, now Pat. No. 6,496,631.

(30) Foreign Application Priority Data

Feb. 24, 2000 (JP) .................................. 2000-048238

(51) Int. Cl.[7] .................................................. G02B 6/02
(52) U.S. Cl. .................................... 385/123; 359/161
(58) Field of Search ................................ 385/123, 124, 385/126, 127; 359/161, 127

(56) References Cited

U.S. PATENT DOCUMENTS

| | | | |
|---|---|---|---|
| 5,886,804 A | * 3/1999 | Onaka et al. | 398/148 |
| 5,995,694 A | * 11/1999 | Akasaka et al. | 385/123 |
| 6,031,955 A | * 2/2000 | Mukasa et al. | 385/123 |
| 6,178,279 B1 | 1/2001 | Mukasa et al. | 385/123 |
| 6,324,317 B1 | * 11/2001 | Tanaka et al. | 385/24 |
| 6,366,728 B1 | * 4/2002 | Way et al. | 385/123 |

FOREIGN PATENT DOCUMENTS

| | | |
|---|---|---|
| EP | 1072909 A2 | 1/2001 |
| JP | 10-325913 | 12/1998 |

OTHER PUBLICATIONS

Takao Naito, Naomasa Shimojoh, Toshiki Tanaka, Hiroshi Nakamoto, Masaharu Doi, Toshikazu Ueki, and Masuo Suyama, "1 Terabit/s WDM Transmission Over 10,000 km," ECOC'99, PD–2–1, pp. 24–25.

M. Tsukitani, T. Kato, E. Yanada, M. Nakamura, M. Hirano, Y. Ohga, M. Onishi, E. Sasaoka, Y. Makio, and M. Nishimura, "Low–Nonlinearity Dispersion–Flattened Hybrid Transmission Lines Consisting of Low–Nonlinearity Pure–Silica–Core Fibers and Dispersion Compensating Fibers," OCS 99–97.

M. Murakami, H. Maeda, T. Imai, "Long–Haul 16X10 WDM Transmission Experiment Using Higher Order Fiber Dispersion Management Technique," ECOC'98, 20–24, Sep. 1998, pp. 313–314.

(List continued on next page.)

Primary Examiner—Tulsidas Patel
(74) Attorney, Agent, or Firm—McDermott, Will & Emery

(57) ABSTRACT

The present invention relates to an optical transmission line comprising a structure for effectively lowering both of nonlinearity and dispersion slope, and an optical transmission system including the same. The optical transmission line comprises, as a repeatered transmission line disposed between stations, a single-mode optical fiber having a zero-dispersion wavelength in a 1.3-$\mu$m wavelength band and a dispersion-compensating optical fiber for compensating for the chromatic dispersion of the single-mode optical fiber. The optical transmission line has an average dispersion slope $S_{ave}$ of −0.0113 ps/nm²/km or more but 0.0256 ps/nm²/km or less at a wavelength of 1550 nm, and an equivalent effective area $EA_{eff}$ of 50 $\mu$m² or more at the wavelength of 1550 nm, whereas the average dispersion slope $S_{ave}$ and the equivalent effective area $EA_{eff}$ are designed so as to satisfy a predetermined condition such that the bending loss falls within a permissible range of 2 dB/m or more but 10 dB/m or less.

8 Claims, 25 Drawing Sheets

OTHER PUBLICATIONS

K. Fukuchi, M. Kakui, A. Sasaki, T. Ito, Y, Inada, T. Tsuzaki, T. Shitomi, K. Fuji, S. Shikii, H. Sugahara, A. Hasegawa, "1.1–Tb/s (55×20–Gb/s) Dense WDM Soliton Transmission Over 3,020–km Widely–Dispersion–Managed Transmission Line Emplo9ying 1.55/ 1.58–$\mu$m Hybrid Repeaters, ECOC"99, PD 2–10.

T. Tsuritani, N. Takeda, K. Imai, K. Tanaka, A, Agata, I. Morita, H. Yamauchi, N. Edagawa, and M. Suzuki, "1 Tbit/s (100×10.7 Gbits/s) Transoceanic Transmission Using 30nm–Wide Broadband Optical Repeaters with Aeff–Enlarged Positive Dispersion Fibre and Slope–Compensating DCF," ECOC'99, PD–2–8.

Itsuro Morita, Keiji Tanaka, Noboru Edagawa, and Masatoshi Suzuki, "40 Gbits/s X 16 WDM Transmission Over 2000 Km Using Dispersion Managed Low–Nonlinear Fiber Span," pp. 25–26.

Toshiki Tanaka, Naomasa Shimojoh, Takao Naito, Hiroshi Nakamoto, Izumi Yokota, Toshikazu Ueki, Akira Sugiyama, and Masuo Suyama," 2.1–Tbits/s WDM Transmission Over 7,221 km With 80–km Repeater Spacing," Fujutsu Laboratories, Ltd., Japan (No. /L50).

E. Yanada, M. Tsukitani, E. Sasaoka, Y. Ohga, Y. Makio, M. Nishimura, "Dual–Band Hybrid Transmission Line Consisting Of Pure Silica Core fiber and Dispersion Compensating Fiber," OFC 2000, pp. 92/TuG3–1–94/TuG3–3.

Stig Nissen Knudsen, and Torben Veng, "Large Effective Area Dispersion Compensating Fiber for Cabled Compensation of Standard Single Mode Fiber," OFC 2000, pp. 98/TuG5–1–100/TuG5–3.

C.R. Davidson, C.J. Chen, M. Nissov, A. Pilipetskii, N. Ramanujam, H.D. Kidorf, B. Pedersen, M.A. Mills, C. Lin, M.I. Hayee, J.X. Cai, A. B. Puc, P.C. Corbett, R. Menges, H. Li, A. Elyamani, C. Rivers, and Neal S. Bergano, "1800 Gb/s Transmission of One Hundred and Eighty GB/s WDM Channels over 7,000 km Using the Full EDFA C–Band," OFC 2000, pp. PD25–1–PD25–3.

Yutaka Miyamoto, Kazushige Yonenaga, Shoichiro Kuwahara, Masahito Tomizawa, Akira Hirano, Hiromu Toba, Koichi Murata, Yasuhiko Tada, Yohtaro Umeda, and Horoshi Miyazawa, "1.2–Tbit/s (30×42.7–Gbit/s ETDM Optical Channel) WDM Transmission Over 376 km With 125–km Spacing Using Forward Error Correction and Carrier–Suppressed RZ Format," OFC 2000, pp. PD26–1–PD26–3.

M. Nissov, J.X. Cai, M.I. Hayee, A.N. Pilipetskii, S.G. Evangelides Jr., B. Pedersen, N. Ramanujam, C.R. Davidson, C.J. Chen, M.A. Mills, R, Menges, P.C. Corbett, C. Rivers, and N.S. Bergano, "32×20 Gb/s Transmission Over Trans–Atlantic Distance (6,200 km) With 31% Spectral Efficiency," OFC 2000, pp. PD30–1–PD30–3.

Takaaki Suzuki, Kazuhiko Aikawa, Kuniharu Himeno, Akira Wada, and Ryozo Yamauchi,"Large–Effective–Area Dispersion Compensating Fibers For Dispersion Accommodation Both in the C and L Band," Fifth Optoelectronics and Communications Conference (OECC 2000) Technical Digest, Jul. 2000, 14C4–4, pp. 554–555.

T. Tsuritani, A. Agata, K. Imai, I. Morita, K. Tanaka, T. Miyakawa, N. Edagawa, and M. Suzuki, "35 GHz–Spaced–20GBPS X 100 WDM RZ Transmission Over 2700 km Using SMF–Based Dispersion Flattened Fiber Span," ECOC 2000, 1.5.

J.X. Cai, M.I. Hayee, M. Nissov, M. A. Mills, A.N. Pilipetskii, S.G. Evangelides Jr., N. Ramanujam, C.R. Davidson, R. Menges, P.C. Corbett, D. Sutton, G. Lenner, C. Rivers, and N.S. Bergano, "1.12 Tb/s Transmission Over Trans–Atlantic Distance (6,200 km) Using Fifty Six 20 GB/s Channels," ECOC 2000, 1.6.

Yukio Kobayashi, Kaoru Kinjo, Kazuyuki Ishida, Takashi Sugihara, Satoshi Kajiya, Naoki Suzuki, and Katsuhiro Shimizu, "A Comparison Among Pure–RZ, CS–RZ and SSB–RZ Format, 1n 1 Tbit/s (50×20 Gbit/s, 0.4nm Spacing) WDM Transmission Over 4,000 km," ECOC 2000, 1.7.

Tsukitani, M. et al., "Low–loss dispersion–flattened hybrid transmission lines consisting of low–nonlinearity pure silica core fibres and dispersion compensating fibres", Electronics Letters, Jan. 6, 2000, vol. 36, No. 1, pp. 64–66.

Sasaoka, E. et al., "Design optimization of SMF–DCF hybrid transmission lines for long haul large capacity WDM transmission systems", Proceedings APCC/OECC '99, Fifth Asia–Pacific Conference on Communications and fourth Optoelectronics and Communications Conference, Oct. 18–22, 1999, Beijing China.

Tsukitani, M. et al., "Low–Nonlinearity IPSCR+DCF Hybrid Transmission Line Comprising Low–Dispersion Slope and Low–Nonlinearity", November 1999, pp. 67–72.

Yanada, E. et al., "Dual–Band Hybrid Transmission Line Consisting of Pure Silica Core Fiber and Dispersion Compensating Fiber", Trends in Optics and Photonics, vol. 37, Optical Fiber Communication Conference, Mar. 7–10, 2000, USA, pp. 92–94.

Tsukitani, M. et al., "Development of a Long–Haul Large–Capacity Wavelength–Division Multiplexed Optical Transmission Line", Sep. 2000, pp. 45–49.

Tsukitani, M. et al., "Development of a Long–haul, Large–capacity, Wavelength–division Multiplexed Optical Transmission Line", Jan. 2001, pp. 55–60, SEI Technical Review.

Kazunori Mukasa et al., "Dispersion flat and Low non–linear Optical Link with New type of Reverse Dispersion Fiber (RDF–60)", Optical Fiber Communication Conference and Exhibit, Technical Digest, Tuesday Mar. 20, 2001, pp. TuH7–1–TuH7–3.

* cited by examiner

|  | DCF1 | DCF2 | DCF3 |
|---|---|---|---|
| CHROMATIC DISPERSION (ps/nm/km) | -41.8 | -52.8 | -69.5 |
| DISPERSION SLOPE (ps/nm²/km) | -0.074 | -0.039 | -0.038 |
| TRANSMISSION LOSS(dB/km) | 0.26 | 0.26 | 0.37 |
| MFD ($\mu$m) | 5.1 | 5.4 | 5.7 |
| Aeff ($\mu$m$^2$) | 19.5 | 21.9 | 25.5 |
| LOSS AT 20mm DIAMETER (dB/m) | 1 | 12 | 63 |

| | TRANSMISSION LOSS (dB/km) | Aeff ($\mu m^2$) | CHROMATIC DISPERSION (ps/nm/km) | DISPERSION LOSS (ps/nm²/km) | N2 ($\times 10^{-20} m^2/W$) |
|---|---|---|---|---|---|
| Aeff -ENLARGED PSCF | 0.170 | 110 | 20.4 | 0.059 | 2.8 |

Fig.13

| POINT | DCF RATIO | AVERAGE DISPERSION SLOPE | SPAN LOSS | EAeff | Δ+ | Ra | 2b | TRANS-MISSION LOSS | CHROMATIC DISPERSION | DISPERSION SLOPE | Aeff | BENDING LOSS | $L_{SMF}$ | $L_{DCF}$ | N2 |
|---|---|---|---|---|---|---|---|---|---|---|---|---|---|---|---|
| (1) | 34.3 | 0.000 | 0.203 | 58.1 | 1.6 | 0.46 | 9.07 | 0.265 | -44.97 | -0.114 | 17.6 | 2 | 32.87 | 17.13 | 3.96 |
| (2) | 31.4 | 0.022 | 0.200 | 66.3 | 1.6 | 0.57 | 7.34 | 0.265 | -51.02 | -0.060 | 19.2 | 2 | 34.32 | 15.68 | 3.95 |
| (3) | 32.4 | -0.005 | 0.201 | 61.6 | 1.6 | 0.45 | 9.15 | 0.265 | -48.69 | -0.139 | 17.8 | 4 | 33.79 | 16.21 | 3.96 |
| (4) | 31.4 | 0.000 | 0.200 | 64.4 | 1.6 | 0.48 | 8.60 | 0.265 | -50.96 | -0.128 | 18.2 | 4 | 34.30 | 15.70 | 3.95 |
| (5) | 30.2 | 0.011 | 0.199 | 68.1 | 1.6 | 0.53 | 7.80 | 0.265 | -53.75 | -0.099 | 19.0 | 4 | 34.89 | 15.11 | 3.95 |
| (6) | 29.6 | 0.023 | 0.198 | 71.1 | 1.6 | 0.58 | 7.18 | 0.265 | -55.25 | -0.062 | 20.0 | 4 | 35.19 | 14.81 | 3.94 |
| (7) | 30.7 | -0.006 | 0.199 | 65.7 | 1.6 | 0.46 | 8.89 | 0.265 | -52.68 | -0.154 | 18.2 | 6 | 34.67 | 15.33 | 3.95 |
| (8) | 29.8 | 0.001 | 0.198 | 68.3 | 1.6 | 0.49 | 8.44 | 0.265 | -54.84 | -0.137 | 18.6 | 6 | 35.11 | 14.89 | 3.95 |
| (9) | 29.1 | 0.011 | 0.198 | 70.8 | 1.6 | 0.53 | 7.74 | 0.265 | -56.47 | -0.106 | 19.3 | 6 | 35.43 | 14.57 | 3.95 |
| (10) | 28.8 | 0.023 | 0.197 | 73.3 | 1.6 | 0.58 | 7.06 | 0.265 | -57.34 | -0.064 | 20.3 | 6 | 35.59 | 14.41 | 3.94 |
| (11) | 29.4 | -0.006 | 0.198 | 68.8 | 1.6 | 0.47 | 8.66 | 0.265 | -55.78 | -0.162 | 18.5 | 8 | 35.30 | 14.70 | 3.95 |
| (12) | 28.7 | 0.002 | 0.197 | 71.2 | 1.6 | 0.5 | 8.15 | 0.265 | -57.67 | -0.140 | 19.0 | 8 | 35.65 | 14.35 | 3.94 |
| (13) | 28.2 | 0.013 | 0.197 | 73.6 | 1.6 | 0.54 | 7.55 | 0.265 | -58.93 | -0.104 | 19.8 | 8 | 35.88 | 14.12 | 3.94 |
| (14) | 28.2 | 0.021 | 0.197 | 74.7 | 1.6 | 0.57 | 7.15 | 0.265 | -58.98 | -0.075 | 20.4 | 8 | 35.89 | 14.11 | 3.94 |
| (15) | 27.7 | 0.010 | 0.196 | 74.6 | 1.6 | 0.53 | 7.66 | 0.265 | -60.34 | -0.118 | 19.8 | 10 | 36.13 | 13.87 | 3.94 |
| (16) | 27.7 | 0.021 | 0.196 | 76.0 | 1.6 | 0.57 | 7.12 | 0.265 | -60.33 | -0.077 | 20.6 | 10 | 36.13 | 13.87 | 3.94 |

Fig. 14

| SAMPLE | Δ+ | Ra | 2b | TRANS-MISSION LOSS | CHROMATIC DISPERSION | DISPERSION SLOPE | Aeff | N2 | DCF RATIO | EAeff | EAeff DIFFERENCE |
|---|---|---|---|---|---|---|---|---|---|---|---|
| 1. | 1.0 | 0.51 | 11.92 | 0.205 | -5.66 | -0.015 | 24.5 | 3.55 | 86.0 | 31.0 | 18.2 |
| 2. | 1.2 | 0.46 | 11.34 | 0.215 | -16.20 | -0.042 | 21.0 | 3.68 | 61.2 | 42.4 | 6.8 |
| 3. | 1.4 | 0.42 | 10.94 | 0.235 | -27.28 | -0.078 | 18.6 | 3.82 | 47.0 | 48.4 | 0.8 |
| 4. | 1.6 | 0.37 | 11.12 | 0.265 | -37.10 | -0.101 | 16.7 | 3.96 | 39.0 | 49.1 | 0.1 |
| 5. | 1.8 | 0.35 | 10.73 | 0.310 | -48.89 | -0.135 | 15.4 | 4.09 | 32.3 | 49.2 | 0 |
| 6. | 2.0 | 0.33 | 10.49 | 0.370 | -60.56 | -0.168 | 14.4 | 4.22 | 37.7 | 47.2 | 2.0 |

Fig.15

| SAMPLE | Δ+ | Ra | 2b | TRANS-MISSION LOSS | CHROMATIC DISPERSION | DISPERSION SLOPE | Aeff | N2 | DCF RATIO | EAeff | EAeff DIFFERENCE |
|---|---|---|---|---|---|---|---|---|---|---|---|
| 7. | 1.0 | 0.6 | 9.86 | 0.205 | -17.12 | -0.048 | 26.4 | 3.54 | 59.7 | 56.4 | 14.9 |
| 8. | 1.2 | 0.55 | 9.27 | 0.215 | -30.28 | -0.087 | 22.9 | 3.69 | 44.2 | 65.8 | 5.5 |
| 9. | 1.4 | 0.51 | 8.83 | 0.235 | -44.04 | -0.126 | 20.5 | 3.82 | 34.8 | 69.9 | 1.4 |
| 10. | 1.6 | 0.48 | 8.45 | 0.265 | -58.24 | -0.164 | 18.8 | 3.94 | 28.5 | 71.3 | 0.0 |
| 11. | 1.8 | 0.45 | 8.22 | 0.310 | -72.41 | -0.206 | 17.5 | 4.08 | 24.1 | 69.5 | 1.8 |
| 12. | 2.0 | 0.42 | 8.12 | 0.370 | -86.01 | -0.253 | 16.3 | 4.20 | 21.0 | 65.8 | 5.5 |

Fig.16

| SAMPLE | Δ+ | Ra | 2b | TRANS-MISSION LOSS | CHROMATIC DISPERSION | DISPERSION SLOPE | Aeff | N2 | DCF RATIO | EAeff | EAeff DIFFERENCE |
|---|---|---|---|---|---|---|---|---|---|---|---|
| 13. | 1.0 | 0.72 | 8.64 | 0.205 | -12.50 | 0.002 | 27.6 | 3.54 | 68.1 | 49.6 | 16.7 |
| 14. | 1.2 | 0.66 | 8.05 | 0.215 | -24.86 | -0.020 | 23.8 | 3.68 | 49.5 | 60.1 | 6.2 |
| 15. | 1.4 | 0.61 | 7.64 | 0.235 | -38.04 | -0.043 | 21.1 | 3.82 | 38.3 | 65.2 | 1.1 |
| 16. | 1.6 | 0.57 | 7.34 | 0.265 | -51.02 | -0.064 | 19.2 | 3.95 | 31.4 | 66.3 | 0 |
| 17. | 1.8 | 0.53 | 7.17 | 0.310 | -64.80 | -0.090 | 17.7 | 4.08 | 26.3 | 65.1 | 1.2 |
| 18. | 2.0 | 0.5 | 7.00 | 0.370 | -77.85 | -0.111 | 16.5 | 4.21 | 22.8 | 61.6 | 4.7 |

Fig.17

| SAMPLE | Δ+ | Ra | 2b | TRANS-MISSION LOSS | CHROMATIC DISPERSION | DISPERSION SLOPE | Aeff | N2 | DCF RATIO | EAeff | EAeff DIFFERENCE |
|---|---|---|---|---|---|---|---|---|---|---|---|
| 19. | 1.0 | 0.71 | 8.38 | 0.205 | -19.24 | -0.012 | 28.8 | 3.54 | 56.5 | 63.8 | 12.2 |
| 20. | 1.2 | 0.66 | 7.75 | 0.215 | -32.54 | -0.031 | 25.2 | 3.67 | 42.3 | 72.5 | 3.5 |
| 21. | 1.4 | 0.61 | 7.40 | 0.235 | -46.18 | -0.054 | 22.5 | 3.81 | 33.6 | 75.5 | 0.5 |
| 22. | 1.6 | 0.57 | 7.12 | 0.265 | -60.33 | -0.077 | 20.6 | 3.94 | 27.7 | 76.0 | 0 |
| 23. | 1.8 | 0.53 | 6.98 | 0.310 | -74.65 | -0.106 | 19.0 | 4.07 | 23.6 | 73.7 | 2.4 |
| 24. | 2.0 | 0.5 | 6.82 | 0.370 | -88.74 | -0.130 | 17.8 | 4.19 | 20.5 | 69.8 | 6.2 |

|  | TRANSMISSION LOSS (dB/km) | CHROMATIC DISPERSION (ps/nm/km) | DISPERSION SLOPE (ps/nm²/km) | Aeff (μm²) | N2 (×10⁻²⁰m²/W) |
|---|---|---|---|---|---|
| Aeff-ENLARGED PSCF | 0.171 | 20.4 | 0.059 | 110.0 | 2.8 |
| DCF | 0.243 | -48.6 | -0.128 | 20.7 | 3.85 |

Fig.20

| SPAN AVERAGE TRANSMISSION LOSS (dB/km) | SPAN AVERAGE DISPERSION (ps/nm/km) | SPAN AVERAGE CHROMATIC DISPERSION SLOPE (ps/nm²/km) | EAeff ($\mu m^2$) |
|---|---|---|---|
| 0.197 | -2 | -0.0017 | 71.4 |

Fig.21

| WAVELENGTH | 1530nm | 1540nm | 1550nm | 1560nm | 1570nm | 1580nm | 1590nm | 1600nm |
|---|---|---|---|---|---|---|---|---|
| TRANSMISSION LOSS (dB/km) | 0.203 | 0.200 | 0.197 | 0.195 | 0.195 | 0.195 | 0.196 | 0.198 |

Fig.22

| | SMF | | | | INTER-STATION SPAN |
|---|---|---|---|---|---|
| | TRANSMISSION LOSS | CHROMATIC DISPERSION | Aeff | n2 | EAeff |
| Ge-SM | 0.185 | 17 | 80 | 3.0 | 53.2 |
| PSCF | 0.170 | 17 | 80 | 2.8 | 57.8 |
| Aeff-ENLARGED Ge-SM | 0.185 | 20.4 | 110 | 3.0 | 57.9 |
| Aeff-ENLARGED PSCF | 0.170 | 20.4 | 110 | 2.8 | 61.6 |

Fig. 27

| SAMPLE | Δ+ | TRANSMISSION LOSS(dB/km) AT WAVELENGTH OF 1.45 μm | TRANSMISSION LOSS(dB/km) AT WAVELENGTH OF 1.55 μm | CHROMATIC DISPERSION (ps/nm/km) | DISPERSION SLOPE (ps/nm²/km) | Aeff (μm²) | N2 ($\times 10^{-20}$m²/W) | RAMAN GAIN FACTOR ($\times 10^{-14}$m/W) |
|---|---|---|---|---|---|---|---|---|
| DCF4 | 1.0 | 0.245 | 0.205 | -17.1 | -0.048 | 26.4 | 3.5 | 3.8 |
| DCF5 | 1.2 | 0.255 | 0.215 | -30.3 | -0.087 | 22.9 | 3.7 | 4.1 |
| DCF6 | 1.4 | 0.277 | 0.235 | -44.0 | -0.126 | 20.5 | 3.8 | 4.4 |
| DCF7 | 1.6 | 0.315 | 0.265 | -58.2 | -0.164 | 18.8 | 3.9 | 4.7 |
| DCF8 | 1.8 | 0.385 | 0.310 | -72.4 | -0.210 | 17.5 | 4.1 | 5.1 |
| DCF9 | 2.0 | 0.500 | 0.370 | -86.0 | -0.253 | 16.3 | 4.2 | 5.5 |
| SMF |  | 0.200 | 0.170 | 20.4 | 0.059 | 110.0 | 2.8 | 2.7 |

Fig.30

| CHROMATIC DISPERSION | DISPERSION SLOPE | TRANSMISSION LOSS | Aeff | N2 |
|---|---|---|---|---|
| (ps/nm/km) | (ps/nm²/km) | (dB/km) | ($\mu$m²) | ($\times 10^{-20}$m²/W) |
| 20.4 | 0.060 | 0.170 | 110 | 2.8 |

Fig.31

| SAMPLE | CHROMATIC DISPERSION (ps/nm/km) | DISPERSION SLOPE (ps/nm²/km) | TRANSMISSION LOSS (dB/km) | Aeff (μm²) | N2 (×10⁻²⁰m²/W) | BENDING LOSS (dB/m) |
|---|---|---|---|---|---|---|
| DCF10 | -38.0 | -0.114 | 0.250 | 23 | 3.2 | 2 |
| DCF11 | -38.0 | -0.114 | 0.250 | 23 | 3.2 | 2 |
| DCF12 | -38.0 | -0.114 | 0.250 | 23 | 3.2 | 2 |
| DCF13 | -38.0 | -0.114 | 0.250 | 23 | 3.2 | 2 |
| DCF14 | -40.0 | -0.120 | 0.250 | 25 | 3.2 | 5 |
| DCF15 | -40.0 | -0.120 | 0.250 | 25 | 3.2 | 5 |
| DCF16 | -40.0 | -0.120 | 0.250 | 25 | 3.2 | 5 |
| DCF17 | -40.0 | -0.120 | 0.250 | 25 | 3.2 | 5 |
| DCF18 | -40.0 | -0.120 | 0.250 | 31 | 3.2 | 10 |
| DCF19 | -40.0 | -0.120 | 0.250 | 31 | 3.2 | 10 |
| DCF20 | -40.0 | -0.120 | 0.250 | 31 | 3.2 | 10 |
| DCF21 | -41.0 | -0.123 | 0.250 | 33 | 3.2 | 20 |
| DCF22 | -41.0 | -0.123 | 0.250 | 33 | 3.2 | 20 |
| DCF23 | -41.0 | -0.123 | 0.250 | 33 | 3.2 | 20 |
| DCF24 | -41.0 | -0.123 | 0.250 | 33 | 3.2 | 20 |
| DCF25 | -41.0 | -0.123 | 0.250 | 33 | 3.2 | 20 |

Fig.32

| SAMPLE | AVERAGE CHROMATIC DISPERSION (ps/nm/km) | AVERAGE DISPERSION SLOPE (ps/nm²/km) | AVERAGE SPAN LOSS (dB/km) | EAeff (μm²) | SM LENGTH (km) | DCF LENGTH (km) |
|---|---|---|---|---|---|---|
| 31. | 3 | 0.008 | 0.198 | 83.9 | 35.0 | 15.0 |
| 32. | 1 | 0.002 | 0.201 | 77.8 | 33.3 | 16.7 |
| 33. | -1 | -0.004 | 0.203 | 72.2 | 31.6 | 18.4 |
| 34. | -3 | -0.010 | 0.206 | 67.0 | 29.9 | 20.1 |
| 35. | 3 | 0.008 | 0.197 | 88.6 | 35.5 | 14.5 |
| 36. | 1 | 0.002 | 0.200 | 82.7 | 33.8 | 16.2 |
| 37. | -1 | -0.004 | 0.203 | 77.1 | 32.2 | 17.8 |
| 38. | -3 | -0.010 | 0.205 | 71.9 | 30.5 | 19.5 |
| 39. | 3 | 0.008 | 0.197 | 95.6 | 35.5 | 14.5 |
| 40. | 1 | 0.002 | 0.200 | 89.9 | 33.8 | 16.2 |
| 41. | -1 | -0.004 | 0.203 | 84.5 | 32.2 | 17.8 |
| 42. | -3 | -0.010 | 0.205 | 79.4 | 30.5 | 19.5 |
| 43. | 3 | 0.008 | 0.197 | 98.4 | 35.7 | 14.3 |
| 44. | 1 | 0.002 | 0.199 | 92.8 | 34.1 | 15.9 |
| 45. | -1 | -0.004 | 0.202 | 87.5 | 32.5 | 17.5 |
| 46. | -3 | -0.010 | 0.205 | 82.5 | 30.8 | 19.2 |

OPTICAL TRANSMISSION LINE AND OPTICAL TRANSMISSION SYSTEM INCLUDING THE SAME

This is a continuation in part of Ser. No. 09/792,059 filed Feb. 26, 2001 now U.S. Pat. No. 6,496,631.

BACKGROUND OF THE INVENTION

1. Field of the Invention

The present invention relates to an optical transmission line employed in a repeatered transmission line disposed between stations, and an optical transmission system including the same.

2. Related Background Art

Wavelength division multiplexing (WDM) optical transmission utilizing signals of a plurality of channels included in a 1.55-$\mu$m wavelength band enables high-speed, large-capacity information transmissions. Factors restricting the transmission capacity in this WDM optical transmission include the nonlinearity and dispersion slope of the optical transmission line. Therefore, in order to improve the performance of a WDM optical transmission system, it is important to suppress the nonlinearity of the optical transmission line (e.g., by increasing its effective area) and lower the dispersion slope of the optical transmission line.

Proposed as an optical transmission line aimed at suppressing the nonlinearity and lowering the dispersion slope as such is an optical transmission line having a configuration in which a single-mode optical fiber and a dispersion-compensating optical fiber are connected to each other. The single-mode optical fiber (hereinafter referred to as SMF) has a zero-dispersion wavelength in a 1.3-$\mu$m wavelength band and exhibits, in the 1.55-$\mu$m wavelength band, a positive chromatic dispersion and a positive dispersion slope. On the other hand, the dispersion-compensating optical fiber (hereinafter referred to as DCF) exhibits, in the 1.55-$\mu$m wavelength band, a negative chromatic dispersion and a negative dispersion slope. Hence, the respective lengths of the SMF and DCF are appropriately adjusted, so as to lower the dispersion slope of the optical transmission line as a whole. Also, since the SMF having a relatively large effective area is disposed on the upstream side in the signal propagating direction, the effective area of the whole transmission line is enhanced, and the nonlinearity of the optical transmission line is suppressed.

For example, the conventional optical transmission line disclosed in T. Naito, et. al, "1 Terabit/s WDM Transmission over 10,000 km," ECOC' 99, PD-2-1 (1999), hereinafter referred to as first conventional technique, comprises a configuration in which an SMF and a DCF are connected to each other. The conventional optical transmission line disclosed in Chikutani, et al., "Low Nonlinear PSCF+DCF Complex Transmission Line having Low Dispersion Slope and Low Nonlinearity," IEICE Technical Report, OCS99-97, pp. 67–72 (1999), hereinafter referred to as second conventional example, comprises a configuration in which an SMF (hereinafter referred to as $A_{eff}$-enlarged PSCF) exhibiting an effective area $A_{eff}$ greater than a commonly known value thereof and having a core region made of pure silica (non-intentionally doped silica), and a DCF are connected to each other. The conventional optical transmission line disclosed in M. Murakami, et al., "Quarter Terabit (25×10Gb/s) over 9288 km WDM Transmission Experiment Using Nonlinear Supported RZ Pulse in Higher Order Fiber Dispersion Managed Line," ECOC' 98, PD, pp. 79–81 (1998), hereinafter referred to as third conventional example, comprises a configuration in which an SMF (hereinafter referred to as Ge-SM) having a core region doped with Ge and a DCF are connected to each other.

The conventional optical transmission line disclosed in K. Fukuchi, et al., "1.1-Tb/s (55×20-Gb/s) Dense WDM Soliton Transmission Over 3,020-km Widely-Dispersion-Managed Transmission Line Employing 1.55/1.58-$\mu$m Hybrid Repeaters," ECOC' 99, PD-2-10 (1999), hereinafter referred to as fourth conventional example, comprises a configuration in which an SMF (hereinafter referred to as PSCF (Pure Silica Core Fiber)) having a core region made of pure silica and a DCF are connected to each other. The conventional optical transmission line disclosed in T. Tsuritani, et al., "1 Tbit/s (100×10.7 Gbit/s) Transoceanic Transmission Using 30 nm-Wide Broadband Optical Repeaters with $A_{eff}$-Enlarged Positive Dispersion Fibre and Slope-Compensating DCF," ECOC' 99, PD-2-7 (1999), hereinafter referred to as fifth conventional example, comprises a configuration in which an $A_{eff}$-Enlarged PSCF and a DCF are connected to each other.

SUMMARY OF THE INVENTION

The inventors studied the above-mentioned optical transmission lines according to the first to fifth conventional examples and, as a result, have found the following problems. Namely, effects of fully lowering the nonlinearity and dispersion slope may not be obtained in the optical transmission lines according to the first and second conventional examples since their bending loss is about 1 dB/m so that they are designed to become excessively resistant to bending. In the optical transmission lines according to the third and fourth conventional examples, the effect of lowering the nonlinearity may not fully be obtained since the relative refractive index difference of the core region in the DCF is assumed to be about 1.2%. The effect of fully lowering the nonlinearity may not be expected in the optical transmission line according to the fifth conventional example, since the relative refractive index difference of the core region in the DCF is assumed to be about 2.0%. Here, none of the optical transmission lines according to the third to fifth conventional examples is optimized in terms of the ratio of length of DCF in the whole optical transmission line, and the like.

In order to overcome the problems mentioned above, it is an object of the present invention to provide an optical transmission line comprising a structure for effectively lowering both the nonlinearity and dispersion slope, and an optical transmission system including the same.

The optical transmission line according to the present invention is a repeatered transmission line which has a predetermined span length of L and is disposed between stations, such as transmitting stations, repeater stations, and receiving stations, as a transmission medium suitable for WDM optical transmission utilizing signals of a plurality of channels different from each other. This optical transmission line comprises a single-mode optical fiber having a zero-dispersion wavelength in a 1.3-$\mu$m wavelength band, and a dispersion-compensating optical fiber for compensating for a chromatic dispersion of the single-mode optical fiber. The single-mode optical fiber and the dispersion-compensating optical fiber are successively disposed in this order along a signal propagating direction and are fusion-spliced to each other. The optical transmission line as a whole has an average dispersion slope $S_{ave}$ of −0.0113 ps/nm$^2$/km or more but 0.0256 ps/nm$^2$/km or less at a wavelength of 1550 nm, and an equivalent effective area $EA_{eff}$ of 50 $\mu$m$^2$ or more at the wavelength of 1550 nm.

In particular, the above-mentioned average dispersion slope $S_{ave}$ and equivalent effective area $EA_{eff}$ in the optical transmission line according to the present invention satisfy the following relationship:

$$f(S_{ave}) \leq EA_{eff} \leq g(S_{ave}) \quad (1)$$

where $f(S_{ave})$ is a lower limit function which yields the lower limit of $EA_{eff}$ by the expression:

$$942 \times S_{ave} + 0.609 \times L + 45.7$$

while using the average dispersion slope $S_{ave}$ and the span length L as variable, and $g(S_{ave})$ is an upper limit function which yields the upper limit of $EA_{eff}$ by the expression:

$$885 \times S_{ave} + 0.609 \times L + 60.7$$

while using the average dispersion slope $S_{ave}$ and the span length L as variable.

The relationship represented by the above-mentioned expression (1) indicates an appropriate range of equivalent effective area $EA_{eff}$ for controlling the bending loss within the range from 2 dB/m to 10 dB/m as a permissible range at a span length of 50 km in order to enable high-speed, large-capacity WDM optical transmission not only in C band (having a wavelength of 1530 to 1565 nm) but also in L band (having a wavelength of 1565 to 1625 nm).

Thus, this optical transmission line is a repeatered transmission line in which a single-mode optical fiber and a dispersion-compensating optical fiber are fusion-spliced to each other, in which signals successively propagate through the single-mode optical fiber and dispersion-compensating optical fiber in this order. At the wavelength of 1550 nm, the single-mode optical fiber and dispersion-compensating optical fiber have respective chromatic dispersions with polarities different from each other and respective dispersion slopes with polarities different from each other, whereby the absolute value of chromatic dispersion and the absolute value of dispersion slope become smaller in the optical transmission line as a whole. When the average dispersion slope $S_{ave}$ and equivalent effective area $EA_{eff}$ in the whole optical transmission line are set to satisfy the above-mentioned range, both the nonlinearity and average dispersion slope of the optical transmission line are lowered effectively, whereby a high bit rate (e.g., about 10 Gbits/s) of WDM transmission (high-speed, large-capacity optical transmission) is possible over a wider wavelength band, e.g., from 1530 nm to 1600 nm.

In addition, it is preferred that the optical transmission line as a whole have an average transmission loss of 0.185 dB/km or more but 0.210 dB/km or less at the wavelength of 1550 nm. Preferably, in the wavelength band from 1530 nm to 1600 nm, the average transmission loss is 0.185 dB/km or more but 0.220 dB/km or less. In each case, the transmission loss of the optical transmission line is sufficiently small, so that the input signal power can be made lower, whereby signal waveforms can effectively be restrained from deteriorating due to nonlinear effects.

In the single-mode optical fiber, the effective area $A_{eff}$ at the wavelength of 1550 nm is preferably 100 $\mu m^2$ or more. While the signal power density decreases as the effective area increases, signal waveforms are restrained from deteriorating due to nonlinear effects, whereby the equivalent effective area $EA_{eff}$ becomes greater. Preferably, the single-mode optical fiber has a core region made of pure silica not doped with $GeO_2$. This is because of the fact that, since the transmission loss caused by Rayleigh scattering is lower in the core region (the transmission loss of the whole optical transmission line is lower), the input signal power can be suppressed, whereby the equivalent effective area $EA_{eff}$ becomes greater.

Preferably, the optical transmission line according to the present invention as a whole has a negative average chromatic dispersion at the wavelength of 1550 nm. This is because of the fact that the unstableness in modulation can be suppressed, whereby signal waveforms can effectively be restrained from deteriorating due to cross-phase modulation.

The optical transmission system according to the present invention is suitable for a WDM optical transmission system for enabling large-capacity optical communications and comprises, at least, a receiving station and a transmitting station. One or more repeater stations may be disposed between the receiving station and the transmitting station. The optical transmission line comprising the above-mentioned structure according to the present invention is employed as a repeatered transmission line disposed between the above-mentioned stations in at least one of repeatered transmission lines between a receiving station and a repeater station, between repeater stations, and between a repeater station and a receiving station. When no repeater station exists between a transmitting station and a receiving station, the above-mentioned optical transmission line according to the present invention can be employed as an entire transmission line from the transmitting station to the receiving station.

Since the absolute value of chromatic dispersion and the absolute value of dispersion slope in the whole optical transmission line are set smaller, and both the nonlinearity and average dispersion slope of the optical transmission line are lowered, a high bit rate (10 Gbits/s) of WDM transmission is possible over a wide wavelength band, e.g., from 1530 nm to 1600 nm.

The optical transmission system according to the present invention may also be configured such that the optical transmission line having the above-mentioned structure (exhibiting a negative chromatic dispersion at the wavelength of 1550 nm) is employed in each of a plurality of repeatered transmission lines continuous to each other by way of repeater stations and the like, whereas an optical transmission line constituted by a single-mode optical fiber alone is employed in a repeatered transmission line subsequent thereto. In this case, the absolute value of the average chromatic dispersion in the whole optical transmission system can be made smaller, whereby signal waveforms can effectively be restrained from deteriorating due to cumulative chromatic dispersion.

In typical optical transmission systems, an EDFA (Erbium-Doped Fiber Amplifier) is often utilized as an optical amplifier installed in each repeater station. However, the optical transmission line according to the present invention can elongate the repeating distance by utilizing a Raman amplifier as an optical amplifier.

The optical transmission line according to the present invention, in particular, can suppress the nonlinearity by elongating the span length (repeating distance) between stations, since it comprises a single-mode optical fiber having a zero-dispersion wavelength in the 1.3-$\mu m$ wavelength band and a dispersion-compensating optical fiber for compensating for the chromatic dispersion of the single-mode optical fiber. Also, the span length, which has been about 50 km in typical submarine cables, can be elongated to 80 km or more by employing a Raman amplifier as an optical amplifier installed in a repeater station.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 13 is a table showing characteristics at a wavelength of 1550 nm of first to sixteenth samples (optical transmission lines) indicated by points (1) to (16) in the graph of FIG. 12;

FIG. 14 is a table showing characteristics of each of the first to sixth samples of optical transmission line at a wavelength of 1550 nm when the bending loss of DCF and the average dispersion slope $S_{ave}$ of the whole transmission line are fixed at 2 dB/m and −0.004 ps/nm²/km, respectively;

FIG. 15 is a table showing characteristics of each of the seventh to twelfth samples of optical transmission line at a wavelength of 1550 nm when the bending loss of DCF and the average dispersion slope $S_{ave}$ of the whole transmission line are fixed at 10 dB/m and −0.006 ps/nm²/km, respectively;

FIG. 16 is a table showing characteristics of each of the thirteenth to eighteenth samples of optical transmission line when the bending loss of DCF and the average dispersion slope $S_{ave}$ of the whole transmission line are fixed at 2 dB/m and 0.020 ps/nm²/km, respectively;

FIG. 17 is a table showing characteristics of each of the nineteenth to twenty-fourth samples of optical transmission line at a wavelength of 1550 nm when the bending loss of DCF and the average dispersion slope $S_{ave}$ of the whole transmission line are fixed at 10 dB/m and 0.020 ps/nm²/km, respectively;

FIG. 20 is a table showing characteristics at a wavelength of 1550 nm of the optical transmission line in which the $A_{eff}$-enlarged PSCF and the DCF are fusion-spliced to each other;

FIG. 21 is a table showing the transmission loss in which the $A_{eff}$-enlarged PSCF and the DCF are fusion-spliced to each other at each of wavelengths included within the wavelength range from 1530 nm to 1600 nm;

FIG. 22 is a table showing characteristics at a wavelength of 1550 nm of optical transmission lines in which other kinds of optical fibers are employed as the SMF of the optical transmission line according to the present invention;

FIG. 27 is a table showing characteristics of various optical fiber samples prepared for yielding the results of measurement shown in FIGS. 24A to 26B;

FIG. 30 is a table showing characteristics at a wavelength of 1550 nm of an $A_{\mathit{eff}}$-enlarged PSCF employed as the SMF of each of thirty-first to forty-sixth samples of samples of the optical transmission line according to the present invention;

FIG. 31 is a table showing characteristics at a wavelength of 1550 nm of samples (DCF10–DCF25) of a dispersion compensating Fiber employed to of the optical transmission line according to the present invention;

FIG. 32 is a table showing characteristics at a wavelength of 1550 nm of each of thirty-first to forty-sixth samples of the optical transmission line according to the present invention;

DESCRIPTION OF THE PREFERRED EMBODIMENTS

In the following, embodiments of the optical transmission line according to the present invention and the optical transmission system including the same will be explained in detail with reference to FIGS. 1 to 5, 6A, 6B, 7 to 23, 24A to 26B, 27, 28, 29A to 29C and 30 to 34. In the explanation of drawings, constituents identical to each other will be referred to with numerals or letters identical to each other without repeating their overlapping descriptions.

Figures 1, 2:
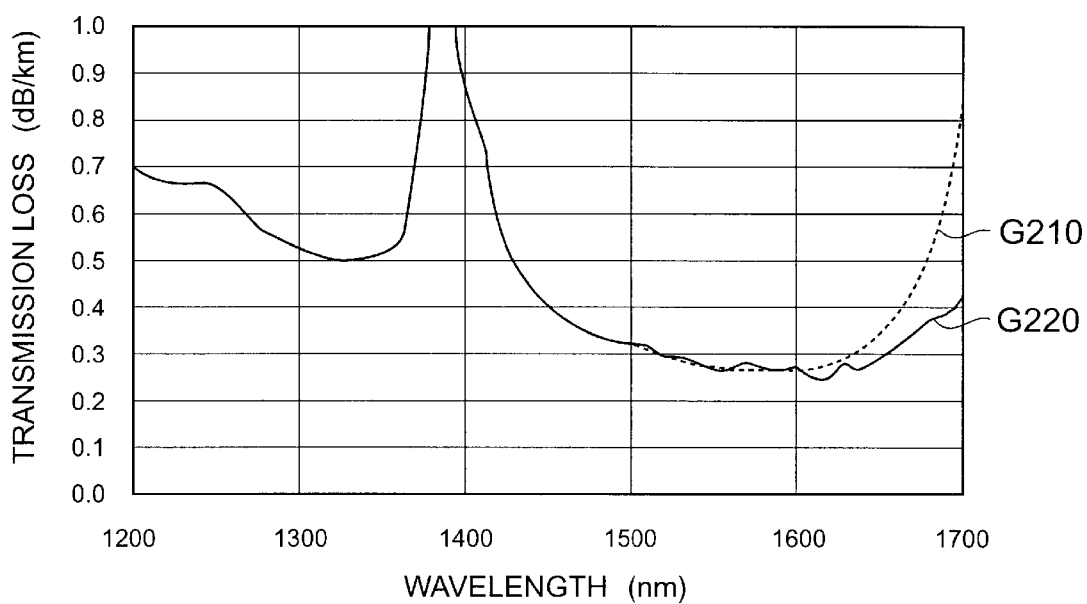
FIG. 1 is a table showing the chromatic dispersion, dispersion slope, transmission loss, mode field diameter, effective area, and bending loss at a diameter of 20 mm in each of three kinds of DCFs (DCF1 to DCF3) at a wavelength of 1550 nm.
FIG. 2 is a graph showing the wavelength dependence of transmission loss of DCF1 in each of the respective states where it is wound about a bobbin and formed into a cable.

First, for each of three kinds of DCFs having the characteristics (at a wavelength of 1550 nm) shown in FIG. 1, the inventors measured respective transmission loss characteristics in the state where it was wound about a plastic bobbin (having a diameter of 280 mm) and where it was formed into a cable (assuming a submarine cable). As a result, the transmission of DCF has been found to become lower in the state formed into a cable than in the state wound about the bobbin.

Figure 3:
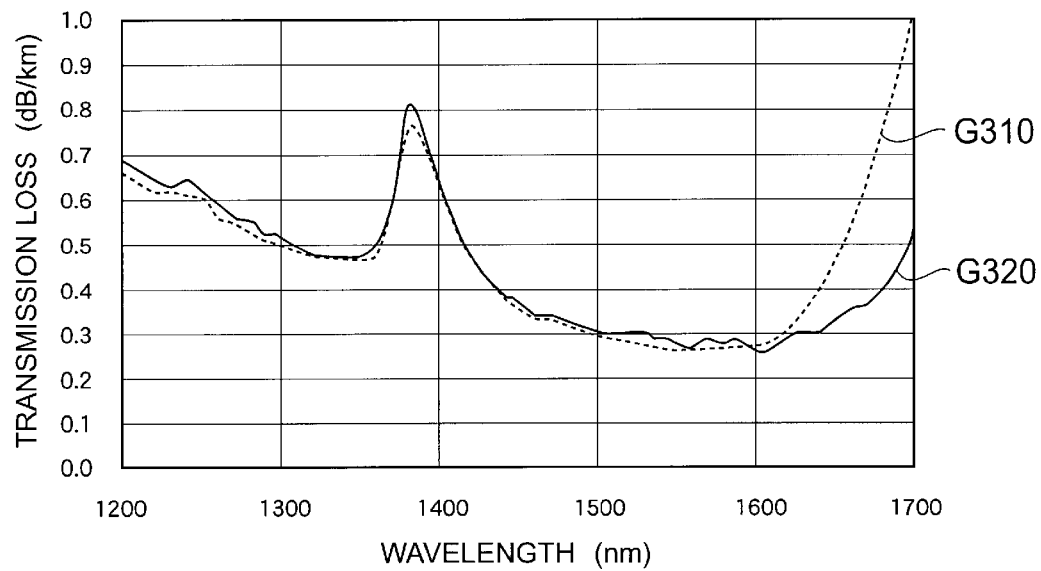
FIG. 3 is a graph showing the wavelength dependence of transmission loss of DCF2 in each of the respective states where it is wound about a bobbin and formed into a cable.
Figure 4:
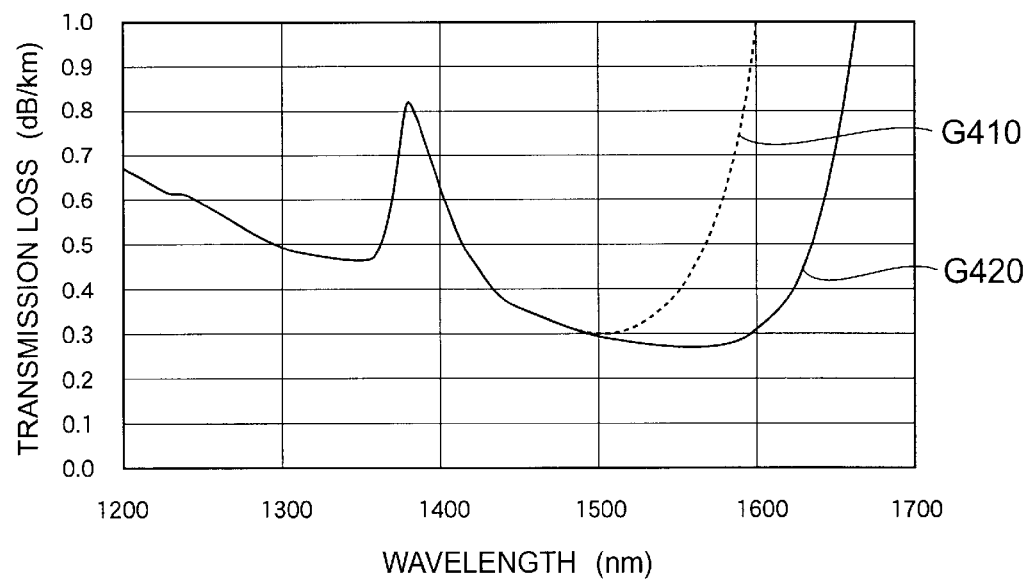
FIG. 4 is a graph showing the wavelength dependence of transmission loss of DCF3 in each of the respective states where it is wound about a bobbin and formed into a cable.

FIG. 1 is a table showing the chromatic dispersion, dispersion slope, transmission loss, mode field diameter (MFD), effective area ($A_{\mathit{eff}}$), and bending loss at a diameter of 20 mm (measured in the state wound about a mandrel having a diameter of 20 mm) in each of the three kinds of DCFs (DCF1, DCF2, and DCF3) at the wavelength of 1550 nm. FIGS. 2 to 4 are graphs showing the wavelength dependence characteristics of transmission loss in DCF1, DCF2, and DCF3, respectively. In FIGS. 2 to 4, curves G210, G310, and G410 show the respective transmission loss characteristics of DCFs in the state wound about the bobbin, whereas curves G220, G320, and G420 show the respective transmission loss characteristics of DCFs in the state formed into a cable.

The following facts can be seen from the graphs shown in FIGS. 2 to 4. Namely, when compared with the state wound about the bobbin, the DCF in the cable form yields a lower bending loss, and a lower transmission loss on the longer wavelength side, thereby widening the permissible range of bending level. If the bending loss is about 2 dB/m, the DCF will not increase the loss until the wavelength reaches about 1625 nm even in the state wound about the bobbin, which is preferable for transmitting signals of L band (having a wavelength of 1565 to 1625 nm). If the bending loss is about 10 dB/m, on the other hand, the DCF will not increase the loss until the wavelength reaches about 1625 nm when formed into a cable, which is preferable for transmitting signals of L band. If the bending loss is about 50 dB/m, the DCF will not increase the loss until the wavelength reaches about 1565 nm when formed into a cable, which is preferable for transmitting signals of C band (having a wavelength of 1530 to 1565 nm). Thus, the permissible range of bending loss in DCF has been determined from the characteristics after being formed into a cable. Therefore, the inventors studied the dependence of the relationship between the equivalent effective area and dispersion slope upon bending loss, and then the optimization of the relationship between the equivalent effective area and dispersion slope from the permissive range of bending loss determined as mentioned above.

Here, the equivalent effective area $EA_{\mathit{eff}}$ of an optical transmission line is defined as follows. First, as an amount quantitatively representing the nonlinearity, a value $\Delta\phi$ (nonlinearity index) obtained when the phase shift amount caused by self-phase modulation is integrated over the repeating section (span length L) is introduced. This $\Delta\phi$ is given by the following expressions (2a) and (2b):

$$\Delta\phi = k \int_0^L \frac{N_2(z)}{A_{\mathit{eff}}(z)} P(z)\,dz \qquad (2a)$$

$$P(z)=P_0\exp(-\alpha\cdot z) \qquad (2b)$$

where k is the wave number, z is the variable representing the distance (position in the longitudinal direction) from the light input end of the optical transmission line, $N_2(z)$ is the nonlinear refractive index (according to XPM (cross-phase modulation) method) of the optical transmission line at the position z, $A_{\mathit{eff}}(z)$ is the effective area of the optical transmission line at the position z, P(z) is the optical power at the position z of optical transmission line, a is the transmission loss of the optical transmission line, and $P_0$ is the optical power at the light input end of the optical transmission line, which is adjusted such that the optical power P(L) at the output end of the line becomes constant in order to attain a predetermined S/N ratio at the output end of the line.

Also assumed is a non-zero dispersion-shifted optical fiber (hereinafter referred to as DSF) having a transmission loss of 0.210 dB/km, a nonlinear refractive index $N_2$ of $3.2\times10^{-20}$ $m^2/W$, and an effective area $A_{\mathit{eff}}$ of 55 $\mu m^2$ as characteristics at the wavelength of 1550 nm, and a length L. When the nonlinearity index $\Delta\phi_{(DSF)}$ of the DSF having an effective area $A_{\mathit{eff}}$ is equal to the $\Delta\phi$ of the optical transmission line, this effective area $A_{\mathit{eff}}$ is defined as the equivalent effective area $EA_{\mathit{eff}}$ of the optical transmission line. Using these parameters, the equivalent effective area of the optical transmission line $EA_{\mathit{eff}}$ is represented by the following expression (3):

$$EA_{\mathit{eff}} = A_{\mathit{eff}(DSF)} \frac{\Delta\phi_{(DSF)}}{\Delta\phi} \qquad (3)$$

Figure 5:
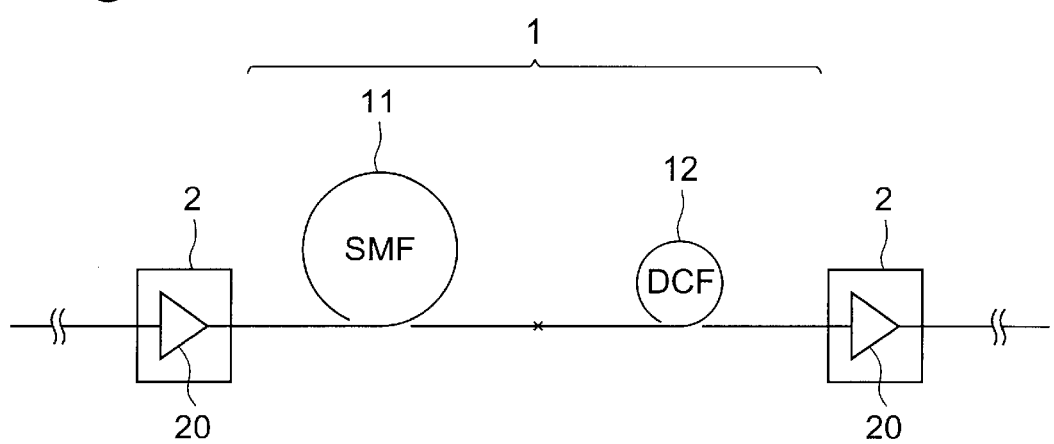
FIG. 5 is a diagram showing the configuration of an embodiment of the optical transmission line according to the present invention.

FIG. 5 is a diagram showing the configuration of an optical transmission line according to the present invention. As depicted, this optical transmission line 1 is disposed as a repeatered transmission line between a station (transmitting station or repeater station) 2 and a station (receiving station or repeater station) 2. The optical transmission line 1 comprises a configuration in which an SMF 11 on the upstream side and a DCF 12 on the downstream side are fusion-spliced to each other. The SMF 11 is a single-mode optical fiber having a zero-dispersion wavelength in the 1.3-$\mu$m wavelength band and a positive chromatic dispersion and a positive dispersion slope in the 1.55-$\mu$m wavelength band. The DCF 12 is a dispersion-compensating optical fiber having a negative chromatic dispersion and a negative dispersion slope in the 1.55-$\mu$m wavelength band. When the station 2 is a repeater station, this station is provided with an EDFA or Raman amplifier as an optical amplifier 20.

Figure 6A:
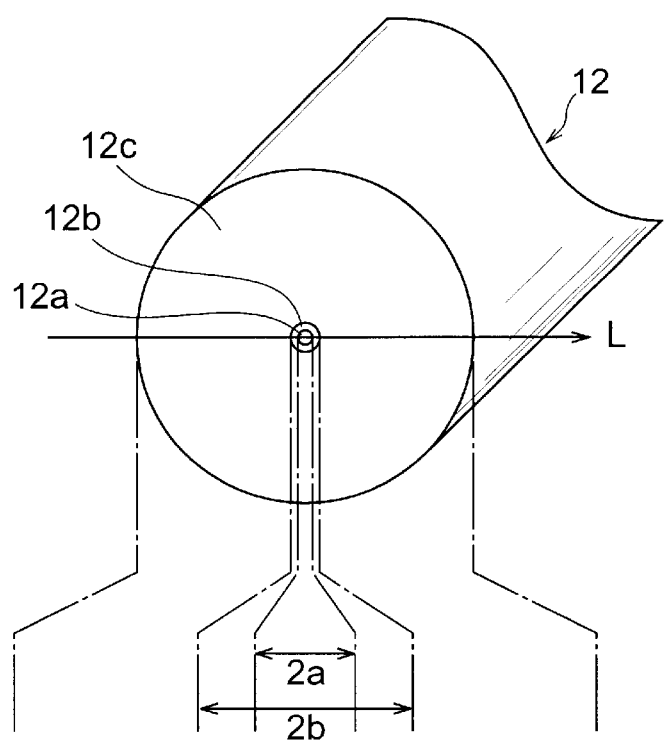
FIGS. 6A and 6B are views showing the cross-sectional structure of a DCF applicable to the optical transmission line according to the present invention and its refractive index profile, respectively.

FIG. 6A is a view showing the cross-sectional structure of the DCF 12. The DCF 12 comprises a core region 12a having a refractive index n, and extending along a predetermined axis, e.g., an optical axis; an inner cladding region 12b, disposed at the outer periphery of the core region 12a, having a refractive index $n_2$ lower than that of the core region 12a; and an outer cladding region 12c, disposed at the outer periphery of the inner cladding region 12b, having a refractive index $n_3$ higher than that of the inner cladding region 12b. Also, the coreregion 12a has an outside diameter 2a and a relative refractive index difference of $\Delta^+$ (=$(n_1^2-n_3^2)/2n_3^2$) with respect to the outer cladding region 12c acting as a reference region, whereas the inner cladding region 12b has an outside diameter 2b and a relative refractive index difference of $\Delta^-$ (=$(n_3^2-n_2^2)/2n_3^2$) with respect to the outer cladding region 12c acting as the reference region. Here, the ratio of the outside diameter of the core region 12a to the outside diameter of the inner cladding region 12b is expressed by Ra (=a/b).

Figure 6B:
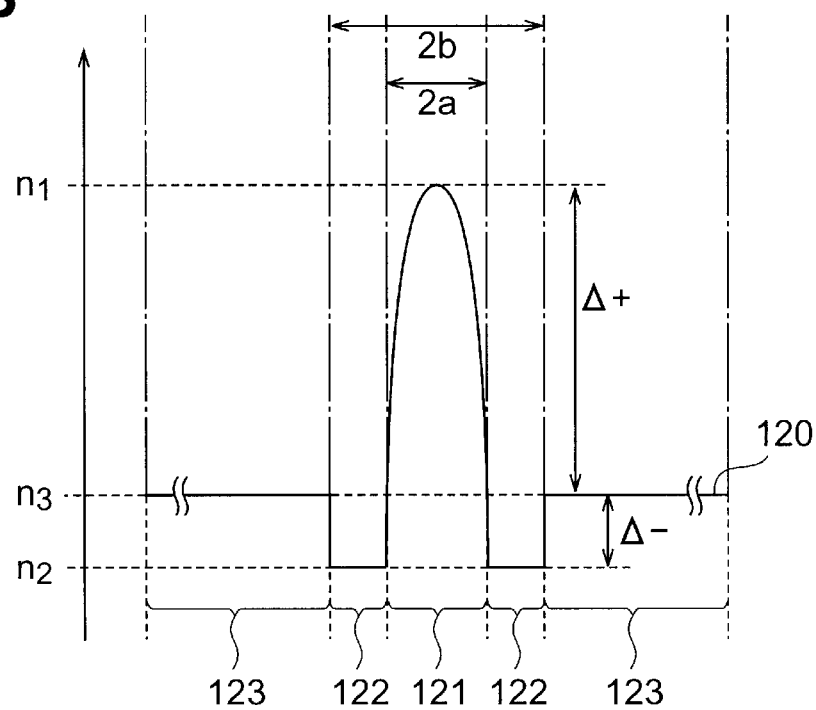

The refractive index profile 120 shown in FIG. 6B corresponds to the refractive index of each part on the line L in FIG. 6A, whereas areas 121, 122, and 123 indicate the refractive indices of core regions 12a, inner cladding region 12b, and outer cladding region 12c on the line L in FIG. 6A, respectively.

The inventors carried out studies about optimal designing of the optical transmission line 1 by changing the outside diameter 2a, relative refractive index difference $\Delta^+$, and outside diameter ratio Ra of the core region 12a of the DCF 12 while fixing the relative refractive index difference $\Delta^-$ of the inner cladding region 12b of the DCF 12 at $-0.4\%$. Further, while fixing the bending loss of DCF 12 (at the wavelength of 1550 nm and a bending diameter of 20 mm) at a predetermined value and changing the relative refractive index difference $\Delta^+$ of the core region of DCF 12 within the range from 1.0% to 2.0%, the chromatic dispersion, dispersion slope, and effective area $A_{eff}$ of the DCF 12 were calculated, whereby the equivalent effective area $EA_{eff}$ of the optical transmission line 1 with respect to each value of refractive index difference $\Delta^+$ of the DCF 12 was determined.

Figures 7, 8:
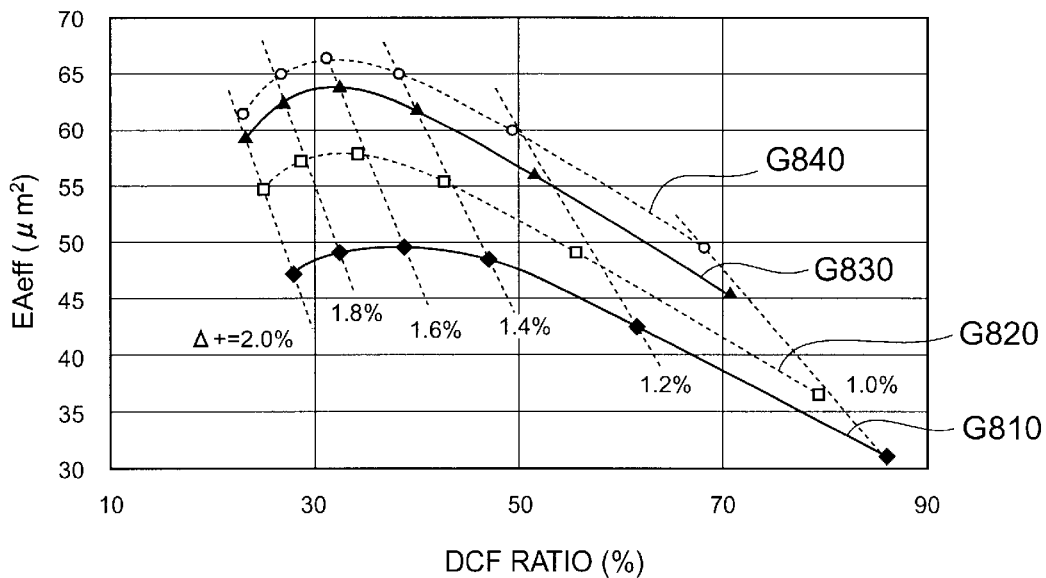
FIG. 7 is a table showing characteristics of an SMF at a wavelength of 1550 nm.
FIG. 8 is a graph showing relationships between the DCF ratio and equivalent effective area $EA_{eff}$ when the bending loss is 2 dB/m.

FIG. 7 is a table showing characteristics of the SMF 11 at the wavelength of 1550 nm. The SMF 11 has a core region made of pure silica (non-intentionally doped silica) and exhibits a transmission loss of 0.170 dB/km, an effective area $A_{eff}$ of 110 $\mu m^2$, a chromatic dispersion of 20.4 ps/nm/km, a dispersion slope of 0.059 ps/nm$^2$/km, and a nonlinear refractive index $N_2$ of $2.8 \times 10^{-20}$ m$^2$/W. Namely, the SMF 11 is an $A_{eff}$-enlarged PSCF.

Under the condition where the length L of the optical transmission line 1 as the repeatered transmission line was 50 km and the average chromatic dispersion of the whole optical transmission line was $-2$ ps/nm/km, the inventors studied about the optimum length ratio between the SMF 11 and DCF 12. The average transmission loss of optical transmission line 1 is determined by a weighted average of the respective transmission losses of SMF 11 and DCF 12 with their lengths, whereas the average dispersion slope of optical transmission line 1 is determined by a weighted average of the respective dispersion slopes of SMF 11 and DCF 12 with their lengths. The equivalent effective area $EA_{eff}$ of the optical transmission line 1 is obtained by carrying out the integrating calculations of the above-mentioned expressions (2a) and (2b) and utilizing the above-mentioned expression (3).

The average chromatic dispersion of optical transmission line 1 is set to $-2$ ps/nm/km due to the following reasons. In optical transmission lines employed in submarine cables, each repeatered transmission line is provided with a negative chromatic dispersion in general in order to prevent modulation instability. Therefore, providing the optical transmission line 1 with a negative average chromatic dispersion is preferable since it restrains the modulation instability. Such setting of the average chromatic dispersion is also effective in restraining signal waveforms from deteriorating due to cross-phase modulation (XPM). In view of the foregoing reasons, the average chromatic dispersion of the optical transmission line 1 is set to $-2$ ps/nm/km.

Under the above-mentioned conditions, the inventors determined a relationship between the length ratio of DCF 12 (hereinafter referred to as DCF ratio) in the optical transmission line 1 acting as a repeatered transmission line and the equivalent effective area $EA_{eff}$ of the optical transmission line 1 when the bending loss (at the wavelength of 1550 nm and a bending diameter of 20 mm) was fixed at a given value within the range from 2 dB/m to 10 dB/m as a range of bending loss in which the loss would not increase until the wavelength reached 1600 nm in a state where the optical transmission line 1 was formed into a submarine cable.

Figure 9:
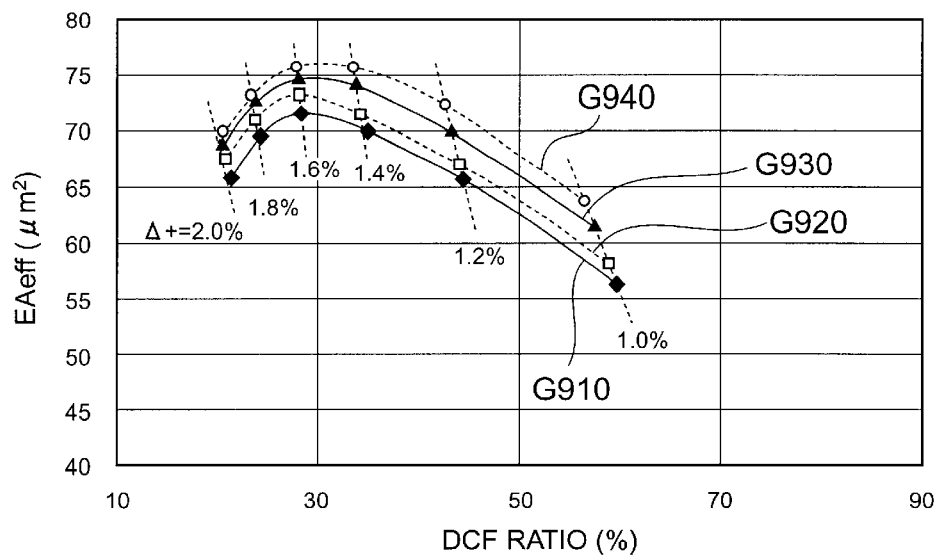
FIG. 9 is a graph showing relationships between the DCF ratio and equivalent effective area $EA_{eff}$ when the bending loss is 10 dB/m.

FIG. 8 is a graph showing the relationship between the DCF ratio and equivalent effective area $EA_{eff}$ when the bending loss is 2 dB/m at each value of the average dispersion slope $S_{ave}$ of optical transmission line 1 and the relative refractive index difference $\Delta^+$ of DCF 12. FIG. 9 is a graph showing the relationship between the DCF ratio and equivalent effective area $EA_{eff}$ when the bending loss is 10 dB/m at each value of the average dispersion slope $S_{ave}$ of optical transmission line 1 and the relative refractive index difference $\Delta^+$ of DCF 12. Here, curve G810 plots the results of calculation of DCF 12 concerning the average dispersion slope $S_{ave}$ of $-0.004$ ps/nm$^2$/km when the relative refractive index difference $\Delta^+$ of DCF 12 is 1.0%, 1.2%, 1.4%, 1.6%, 1.8%, and 2.0%, respectively. Similarly, in FIGS. 8 and 9, curves G820, G830, G840, G910, G920, G930, and G940 indicate the respective results of calculation when the average dispersion slope $S_{ave}$ is 0.000 ps/nm$^2$/km, 0.010 ps/nm$^2$/km, 0.020 ps/nm$^2$/km, $-0.006$ ps/nm$^2$/km, 0.000 ps/nm$^2$/km, 0.010 ps/nm$^2$/km, and 0.020 ps/nm$^2$/km, respectively.

Figure 10:
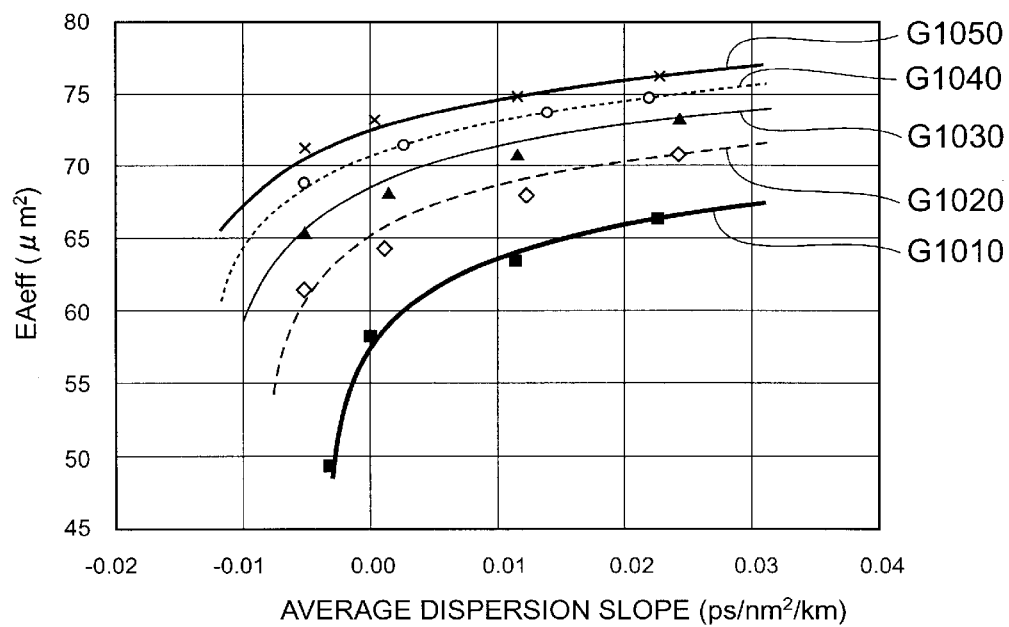
FIG. 10 is a graph showing relationships between the average dispersion slope $S_{ave}$ and maximum equivalent effective area $EA_{eff}$ in the optical transmission line according to the present invention.

FIG. 10 is a graph showing relationships between the average dispersion slope $S_{ave}$ in the optical transmission line 1 and the maximum value of equivalent effective area $EA_{eff}$ when the average dispersion slope $S_{ave}$ is obtained. In FIG. 10, curves G1010, G1020, G1030, G1040, and G1050 indicate the respective relationships when the bending loss (at the wavelength of 1550 nm and a bending loss of 20 mm) is 4 dB/m, 6 dB/m, 8 dB/m, and 10 dB/m.

The relationships between the average dispersion slope $S_{ave}$ and equivalent effective area $EA_{eff}$ (curves G1010 to G1050) shown in FIG. 10 are approximated by the following expression (4):

$$EA_{eff} = \frac{0.4481 + \sqrt{(0.4481)^2 - 4 \times 0.00518 \times (3.29 - \ln\{S_{ave} + 0.0053 + 0.016[\log 10(BL) - \log 2]\})}}{2 \times 0.00518} + 12[\log(BL) - \log 2] \quad (4)$$

where BL is the bending loss of DCF 12 at a bending diameter of 20 mm. Namely, each of curves G1010 to G1050 is represented by the above-mentioned expression (4) as a graph indicating the relationship between the average dispersion slope $S_{ave}$ and the equivalent effective area $EA_{eff}$.

When the optical transmission line is formed into a submarine cable, it is desirable that the bending loss be prevented from increasing in the range where the wavelength is not longer than 1625 nm, for which the bending loss BL of DCF 12 is required to be 10 dB/m or less. On the other hand, the bending loss BL of DCF 12 is preferably 2 dB/m or more since optical characteristics deteriorate in terms of transmission loss and nonlinearity when it is excessively resistant to bending (i.e., when its bending loss is extremely low).

When actually making a submarine cable, an optical transmission line having a negative average chromatic dispersion is employed in a plurality of repeatered transmission lines which are continuous to each other by way of repeaters, and an optical transmission line having a positive chromatic dispersion is employed in a repeatered transmission line subsequent thereto, so that the average chromatic dispersion of the whole submarine cable becomes substantially 0 ps/nm/km. Such a configuration effectively restrains signal waveforms from deteriorating due to the cumulative chromatic dispersion of the whole submarine cable.

Figure 11:
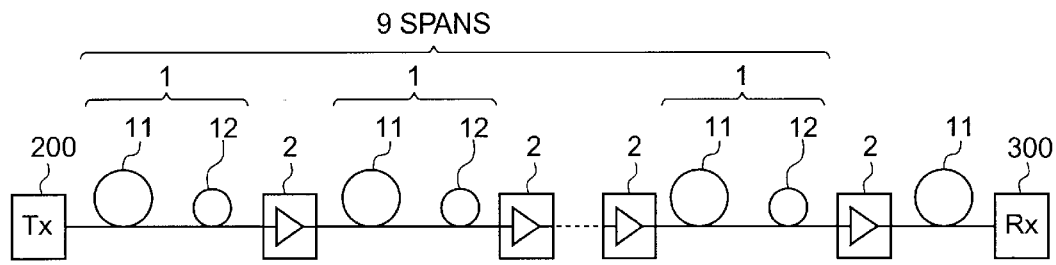
FIG. 11 is a diagram showing the configuration of an embodiment of the optical transmission system according to the present invention (in which each of nine continuous sections is provided with an optical transmission line constituted by an SMF and a DCF which are fusion-spliced to each other, whereas one section subsequent thereto is provided with an optical transmission line constituted by the SMF alone)

FIG. 11 is a view showing the configuration of an optical transmission system according to the present invention. In this optical transmission system, a plurality of repeater stations 2 are disposed between a transmitting station 200 and a receiving station 300. In the optical transmission system shown in FIG. 11, the above-mentioned optical transmission line 1 in which the SMF 11 and DCF 12 are fusion-spliced to each other is employed as a repeatered transmission line in each of nine sections which are continuous to each other by way of the repeater stations 2, and an optical transmission line made of the SMF 11 alone is employed as the repeatered transmission line in one section subsequent thereto. The optical transmission line 1 (repeatered transmission line) in each of the nine sections has a length of 50 km and an average chromatic dispersion of −2 ps/nm/km. In order for the average chromatic dispersion of the 10 sections in total to become substantially 0 ps/nm/km, the section made of the SMF 11 alone is required to have an optical transmission line length of 44 km (=2 (ps/nm/km)×50 (km)×9/20.4 (ps/nm/km)), whereby the total length (of 10 sections) of the optical transmission system becomes 494 km (=50×9+44).

In the signal transmission at 10 Gbits/s, it is considered necessary to suppress the absolute value of cumulative chromatic dispersion in optical transmission lines to 1000 ps/nm or less in general. When the signal wavelength band includes both C and L bands (i.e., when the signal wavelength band ranges from 1530 nm to 1600 nm with a bandwidth of 70 nm), the 10 sections in total shown in FIG. 11 are required to have an average dispersion slope of 0.0286 ps/nm²/km (=1000 (ps/nm) /500 (km) /70 (nm) ) or less in order to fulfill the signal transmission at 10 Gbits/s. In the signal transmission at 20 Gbits/s, it is considered necessary to suppress the absolute value of cumulative chromatic dispersion in optical transmission lines to 250 ps/nm or less in general, whereby the 10 sections in total shown in FIG. 11 are required to have an average dispersion slope of 0.0072 ps/nm²/km or less in order to fulfill the signal transmission at 20 Gbits/s when the signal wavelength band includes both C and L bands. On the other hand, the average dispersion slope of the 10 sections shown in FIG. 11 is preferably −0.005 ps/nm²/km or more in order to prevent excess compensation from occurring.

In view of the foregoing, the average dispersion slope of the 10 sections in total shown in FIG. 11 is preferably −0.005 ps/nm²/km or more but 0.0286 ps/nm²/km or less, more preferably −0.005 ps/nm²/km or more but 0.0072 ps/nm²/km or less. Consequently, the average dispersion slope $S_{ave}$ of the optical transmission line 1 employed in each of the nine sections other than the repeating section made of the SMF 11 alone is preferably −0.0113 ps/nm² /km or more but 0.0256 ps/nm²/km or less, more preferably −0.0113 ps/nm²/km or more but 0.0021 ps/nm²/km or less.

In addition to the foregoing conditions, the equivalent effective area $EA_{eff}$ is set to 50 $\mu$m² or greater, whereby the nonlinearity of the optical transmission line 1 is effectively lowered. Further, in view of the fact that the permissible range of bending loss (at the wavelength of 1550 nm and a bending diameter of 20 mm) is set so as to become 2 dB/m or more but 10 dB/m or less in the optical transmission line 1 having a span length of 50 km, the above-mentioned average dispersion slope $S_{ave}$ and equivalent effective area $EA_{eff}$ preferably satisfy the relationship of:

$$f(S_{ave}) \leq EA_{eff} \leq g(S_{ave}) \quad (5)$$

where $f(S_{ave})$ is a lower limit function which yields the lower limit of $EA_{eff}$ by the expression:

$$\frac{0.4481 + \sqrt{(0.4481)^2 - 4 \times 0.00518 \times [3.29 - \ln(S_{ave} + 0.0053)]}}{2 \times 0.00518}$$

while using $S_{ave}$ as a variable, and $g(S_{ave})$ is an upper limit function which yields the upper limit of $EA_{eff}$ by the expression:

$$\frac{0.4481 + \sqrt{(0.4481)^2 - 4 \times 0.00518 \times \{3.29 - \ln[S_{ave} + 0.0053 + 0.016(\log 10 - \log 2)]\}}}{2 \times 0.00518} + 12(\log 10 - \log 2)$$

while using $S_{ave}$ as a variable.

When the condition of the above-mentioned expression (5) is satisfied, both the nonlinearity and dispersion slope of the optical transmission line 1 are effectively lowered. Therefore, this optical transmission line 1 and an optical transmission system using the same enable high-speed, large-capacity WDM transmissions at 10 Gbit/s.

Figure 12:
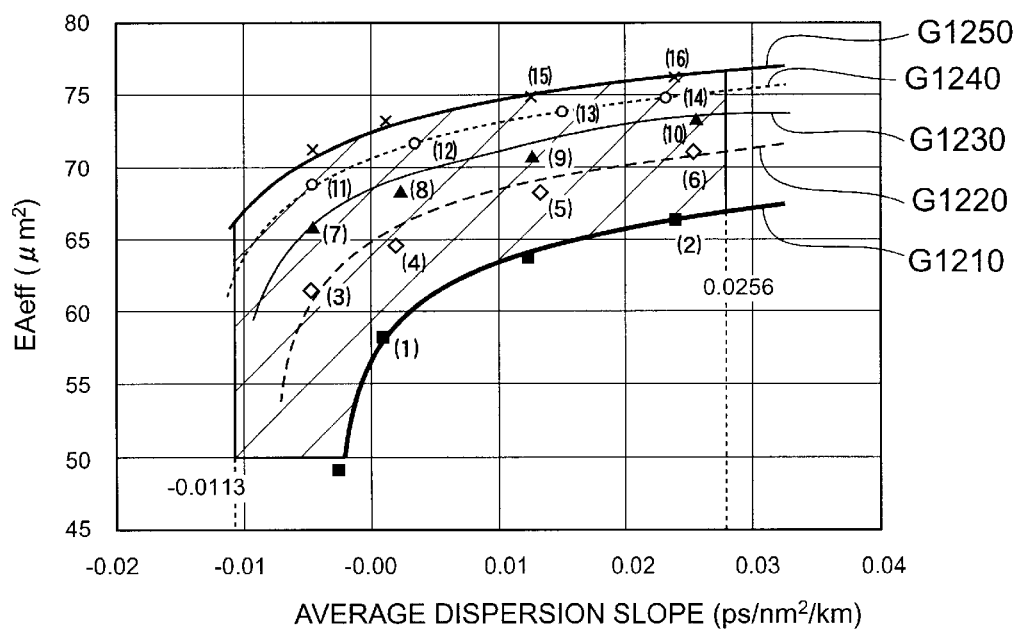
FIG. 12 is a graph hatching a range satisfying a condition concerning the average dispersion slope $S_{ave}$ and equivalent effective area $EA_{eff}$ in the graph shown in FIG. 10.

FIG. 12 is a graph hatching a range satisfying the condition given by the above-mentioned expression (5) (the relationship between the average dispersion slope $S_{ave}$ and equivalent effective area $EA_{eff}$) in the graph shown in FIG. 10. Here, curves G1210, G1220, G1230, G1240, and G1250 in FIG. 12 correspond to curves G1010, G1020, G1030, G1040, and G1050 in FIG. 10, respectively. FIG. 13 is a table showing characteristics at each of points (1) to (16) plotted in FIG. 12. For each of points (1) to (16), FIG. 13 shows, successively from the left side, the DCF ratio (%) of optical transmission line 1, the average dispersion slope $S_{ave}$ (ps/nm$^2$/km) of optical transmission line 1, the span loss (dB/m) of optical transmission line 1, the equivalent effective area $EA_{eff}$ (dm$^2$) of optical transmission line 1, the relative refractive index difference $\Delta^+$ (%) of core region 12a of DCF 12, the outside diameter ratio Ra of DCF 12, the outside diameter 2b ($\mu$m) of inner cladding region 12b of DCF 12, the transmission loss $\alpha$ (dB/km) of DCF 12, the chromatic dispersion (ps/nm/km) of DCF 12, the effective area $A_{eff}$ (dm$^2$) of DCF 12, the bending loss (dB/m) of DCF 12 at a diameter of 20 mm, the length $L_{SMF}$ (km) of SMF 11, the length $L_{DCF}$ (km) of DCF 12, and the nonlinear refractive index $N_2$ ($\times 10^{-20}$ m$^2$/W) of DCF 12.

The dispersion slope of optical transmission line 1 is further reduced in particular when the average dispersion slope $S_{ave}$ of optical transmission line 1 is $-0.0113$ ps/nm$^2$/km or more but $0.0021$ ps/nm$^2$/km or less. Hence, the optical transmission line 1 and an optical transmission system including the same enable high-speed, large-capacity WDM transmissions at 20 Gbits/s. The nonlinearity of optical transmission line 1 is further lowered when the equivalent effective area $EA_{eff}$ is 55 $\mu$m$^2$ or more, more preferably 60 $\mu$m$^2$ or more.

FIG. 14 is a table showing characteristics at the wavelength of 1550 nm of each of first to sixth samples of optical transmission line 1 when the bending loss of DCF 12 and the average dispersion slope $S_{ave}$ of the whole transmission line are fixed at 2 dB/m and $-0.004$ ps/nm$^2$/km, respectively. The first to sixth samples have respective DCFs 12 with structures different from each other. FIG. 15 is a table showing characteristics at the wavelength of 1550 nm of each of seventh to twelfth samples of optical transmission line 1 when the bending loss of DCF 12 and the average dispersion slope $S_{ave}$ of the whole transmission line are fixed at 10 dB/m and $-0.006$ ps/nm$^2$/km, respectively. The seventh to twelfth samples have respective DCFs 12 with structures different from each other. FIG. 16 is a table showing characteristics at the wavelength of 1550 nm of each of thirteenth to eighteenth samples of optical transmission line 1 when the bending loss of DCF 12 and the average dispersion slope $S_{ave}$ of the whole transmission line are fixed at 2 dB/m and $0.020$ ps/nm$^2$/km, respectively. The thirteenth to eighteenth samples have respective DCFs 12 with structures different from each other. FIG. 17 is a table showing characteristics at the wavelength of 1550 nm of each of nineteenth to twenty-fourth samples of optical transmission line 1 when the bending loss of DCF 12 and the average dispersion slope $S_{ave}$ of the whole transmission line are fixed at 10 dB/m and $0.020$ ps/nm$^2$/km, respectively. The nineteenth to twenty-fourth samples have respective DCFs 12 with structures different from each other.

Each of FIGS. 14 to 17 shows, successively from the left side, the relative refractive index difference $\Delta^+$ (%) of core region of DCF 12, the outside diameter ratio Ra of DCF 12, the outside diameter 2b ($\mu$m) of inner cladding region 12b of DCF 12, the transmission loss $\alpha$ (dB/km) of DCF 12, the chromatic dispersion (ps/nm/km) of DCF 12, the dispersion slope (ps/nm$^2$/km) of DCF 12, the effective area $A_{eff}$ ($\mu$m$^2$) of DCF 12, the nonlinear refractive index $N_2$ ($\times 10^{-20}$ m$^2$/W), the DCF ratio (%) of each sample (optical transmission line 1), the equivalent effective area $A_{eff}$ ($\mu$m$^2$) of optical transmission line 1, and the difference in equivalent effective area $EA_{eff}$. The difference in equivalent effective area $EA_{eff}$ represents the difference between the maximum value of equivalent effective area $EA_{eff}$ (maximum equivalent effective area) that can be realized under each condition and the equivalent effective area $EA_{eff}$ at each relative refractive index difference $\Delta^+$.

From the tables of FIGS. 14 to 17, it can be seen that, when the bending loss of DCF 12 is 2 dB/m, the relative refractive index difference $\Delta^+$ (%) at which the equivalent effective area $EA_{eff}$ becomes 95% or more of the maximum equivalent effective area is 1.4% or more but 1.8% or less. When the relative refractive index difference $\Delta^+$ (%) of core region 12a of DCF 12 falls within this range, the optical transmission line 1 can substantially attain the maximum equivalent effective area $EA_{eff}$, thus becoming an optimal design. Also, the above-mentioned range of equivalent effective area $EA_{eff}$ can be expressed as a DCF ratio of 23% or more but 36% or less. If the average chromatic dispersion of optical transmission line 1 is $-3$ ps/nm/km or more but 0 ps/nm/km or less, the chromatic dispersion of DCF 12 will be at $-81$ ps/nm/km or more but $-36$ ps/nm/km or less.

As in the foregoing, when an appropriate range of value is set for each of the DCF ratio and average chromatic dispersion slope $S_{ave}$ of optical transmission line 1 and the bending loss of DCF 12, the equivalent effective area $EA_{eff}$ of optical transmission line can be made greater than that of conventional optical transmission lines, whereby the nonlinearity of optical transmission line 1 is lowered more effectively.

Also, the transmission loss of the whole optical transmission line 1 at the wavelength of 1550 nm is 0.185 dB/km or more but 0.210 dB/km or less, thus being equal to or less than the transmission loss of DSF. When there is no loss caused by bending, the loss caused by Rayleigh scattering in the optical transmission line 1 becomes the greatest at the wavelength of 1530 nm within the wavelength band from 1530 nm to 1600 nm. Since the difference in loss is about 0.01 dB/km, the actual transmission loss in this wavelength band becomes 0.185 dB/km or more but 0.220 dB/km or less. As a consequence, signals can be fed into the SMF 11 at a lower power, whereby the optical transmission line 1 effectively restrains nonlinear optical phenomena from occurring.

Figures 18, 19:
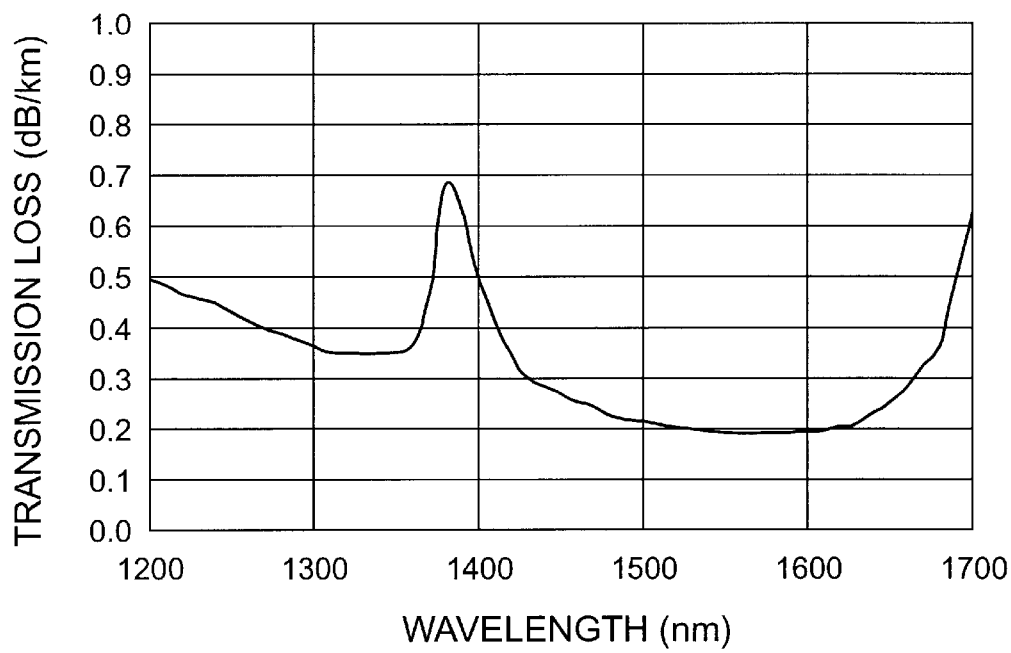
FIG. 18 is a graph showing the wavelength dependence of transmission loss of an optical transmission line in which an $A_{eff}$-enlarged PSCF and a DCF are fusion-spliced to each other.
FIG. 19 is a table showing characteristics of each of the $A_{eff}$-enlarged PSCF and the DCF at a wavelength of 1550 nm.

A specific configuration of the optical transmission line 1 according to the present invention will now be explained with reference to FIGS. 18 to 21. FIG. 18 is a graph showing the wavelength dependence of transmission loss of an optical transmission line having a configuration in which an $A_{eff}$-enlarged PSCF and a DCF are fusion-spliced to each other. FIG. 19 is a table showing characteristics of each of the $A_{eff}$-enlarged PSCF and the DCF at the wavelength of 1550 nm. FIG. 20 is a table showing characteristics at the wavelength of 1550 nm of the optical transmission line having the configuration in which the $A_{eff}$-enlarged PSCF and the DCF are fusion-spliced to each other. FIG. 21 is a table showing the transmission loss of the optical transmission line having the configuration in which the $A_{eff}$-enlarged PSCF and the DCF are fusion-spliced to each other at each of wavelengths included within the wavelength band from 1530 nm to 1600 nm. Here, the loss between the $A_{eff}$-enlarged PSCF and the DCF upon fusion-splicing is 0.11 dB.

As characteristics at the wavelength of 1550 nm, the $A_{eff}$-enlarged PSCF has a transmission loss of 0.171 dB/km, a chromatic dispersion of 20.4 ps/nm/km, a dispersion slope of 0.059 ps/nm²/km, an effective area $A_{eff}$ of 110.0 $\mu$m², and a nonlinear refractive index $N_2$ of 2.8×10⁻²⁰ m²/W. As characteristics at the wavelength of 1550 nm, the DCF has a transmission loss of 0.243 dB/km, a chromatic dispersion of −48.6 ps/nm/km, a dispersion slope of −0.128 ps/nm²/km, an effective area $A_{eff}$ of 20.7 $\mu$m², and a nonlinear refractive index $N_2$ of 3.85×10⁻²⁰ m²/W.

The optical transmission line having a configuration in which the $A_{eff}$-enlarged PSCF and DCF having the above-mentioned characteristics are fusion-spliced to each other, as a whole, has an average transmission loss of 0.197 dB/km, an average chromatic dispersion of −2 ps/nm/km, an average dispersion slope of −0.0017 ps/nm²/km, and an equivalent effective area $EA_{eff}$ of 71.4 m². In the wavelength band from 1530 nm to 1600 nm, the optical transmission line has an average transmission loss of 0.195 dB/km or more but 0.203 dB/km or less, which is substantially uniform.

At the wavelength of 1550 nm, the above-mentioned optical transmission line has a transmission loss of 0.185 dB/km or more but 0.210 dB/km or less, which is equal to or less than the transmission loss of DSF. In the wavelength band from 1530 nm to 1600 nm, the optical transmission line exhibits an average transmission loss of 0.185 dB/nm or more but 0.220 dB/km or less. Therefore, signals can be fed into the $A_{eff}$-enlarged PSCF at a lower power, whereby the optical transmission line can effectively restrain nonlinear optical phenomena from occurring.

Though the foregoing explanation relates to a case where the SMF 11 of optical transmission line 1 is an $A_{eff}$-enlarged PSCF, the SMF 11 is not limited to the $A_{eff}$-enlarged PSCF. FIG. 22 is a table showing characteristics at the wavelength of 1550 nm in other optical transmission lines in which different kinds of optical fibers are employed as the SMF 11 of optical transmission line 1. This table shows the transmission loss (dB/km), chromatic dispersion (ps/nm/km), effective area $A_{eff}$ ($\mu$m²), and nonlinear refractive index $N_2$ (×10⁻²⁰ m²/W) for each of a normal SMF whose core region is doped with Ge (Ge-SM), a normal SMF whose core region is made of pure silica (PSCF), a Ge-SM whose effective area is enlarged ($A_{eff}$-enlarged PSCF) and a Ge-SM whose effective area is enlarged ($A_{eff}$-enlarged Ge-SM) which are employed as the SMF 11, and the equivalent effective area $EA_{eff}$ ($\mu$m² of the optical transmission line including the corresponding one of these SMFs. As the DCF 12, one having the characteristics corresponding to those of point (3) in FIG. 13 is employed.

As can be seen from FIG. 22, the equivalent effective area $EA_{eff}$ of the SMFs whose core is made of pure silica (PSCF and $A_{eff}$-enlarged PSCF) is greater by about 10% than that of the SMFs whose core region is made of pure silica (Ge-SM and $A_{eff}$-enlarged Ge-SM). This is because of the fact that the PSCF and $A_{eff}$-enlarged PSCF yield a smaller transmission loss caused by Rayleigh scattering, so that the transmission loss of the whole transmission line is smaller, whereby the input signal power can be lowered. On the other hand, the equivalent effective area $EA_{eff}$ of the SMFs whose effective area is enlarged ($A_{eff}$-enlarged Ge-SM and $A_{eff}$-enlarged PSCF) is also greater by about 10% than that of the normal SMFs whose effective area is not enlarged (Ge-SM and PSCF). This is because of the fact that the $A_{eff}$-enlarged Ge-SM and $A_{eff}$-enlarged PSCF have a greater effective area, so that the signal power density can be suppressed low, whereby signal waveforms can be restrained from deteriorating due to nonlinear effects. Hence, the equivalent effective area $EA_{eff}$ of the $A_{eff}$-enlarged PSCF is greater by about 20% than that of the Ge-SM. Thus, the nonlinearity of optical transmission line is most effectively lowered when the $A_{eff}$-enlarged PSCF is employed as the SMF 11.

In typical optical transmission systems, EDFA is often utilized as an optical amplifier installed in each repeater station. However, it has recently been proposed to elongate the repeating distance by utilizing a Raman amplifier as an optical amplifier.

In particular, the optical transmission line 1 according to the present invention has a configuration in which the SMF 11 having a zero-dispersion wavelength in the 1.3-$\mu$m wavelength band and the DCF 12 for compensating for the chromatic dispersion of the SMF 11 are fusion-spliced to each other. Therefore, it can suppress the nonlinearity by elongating the span length between stations (repeating distance, i.e., the total length of the optical transmission line 1). Also, when distributed Raman amplification using a repeatered transmission line is employed, the span length, which has been about 50 km in a typical submarine cable, can be elongated to 80 km or more.

Figure 23:
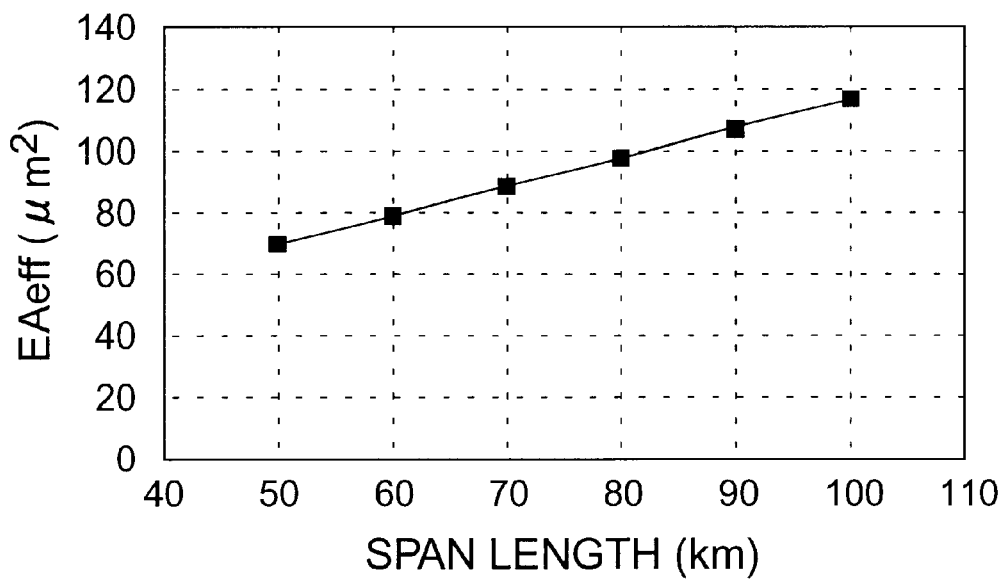
FIG. 23 is a graph showing the relationship between span length (km) and equivalent effective area $EA_{eff}$.

As shown in FIG. 23, the equivalent effective area $EA_{eff}$ and the length of the optical transmission line 1 (span length) have such a relationship that the equivalent effective area $EA_{eff}$ increases as the span length elongates. Therefore, it is seen that, as the span length increases, the equivalent effective area $EA_{eff}$ becomes greater, and the relative nonlinearity lowers conversely. Here, FIG. 23 shows the results of calculation concerning a DCF whose core region 12a has a relative refractive index difference $\Delta^+$ of 1.4%.

Since the curve shown in FIG. 23 appears to be substantially linear, the equivalent effective area $EA_{eff}$ and span length L (km) in the optical transmission line 1 can be related to each other as defined by the following expression (6):

$$EA_{eff} = 0.981 \cdot L + C(\text{const}) \tag{6}$$

If the span length L is 50 km here, then the constant C1 in the above-mentioned expression (6) when the equivalent effective area $EA_{eff}$ is at the lower limit $f(S_{ave})$ is given by the expression of $f(S_{ave}) - 0.981 \times 50 = f(S_{ave}) - 49.05$, since the relationship of the above-mentioned expression (5) holds. On the other hand, the constant C2 in the above-mentioned expression (6) when the equivalent effective area $EA_{eff}$ is at the upper limit $g(S_{ave})$ is given by the expression of $g(S_{ave}) - 0.981 \times 50 = g(S_{ave}) - 49.05$. Therefore, the optimal equivalent effective area $EA_{eff}$ when the span length is L (km) preferably satisfies the following expression (7):

$$0.981 \cdot L + C1 \leq EA_{eff} \leq 0.981 \cdot L + C2 \tag{7}$$

Satisfying the condition of expression (7) yields a repeatered transmission line in which the effective area $EA_{eff}$ increases as the span length elongates, so as to effectively suppress the nonlinearity.

Figure 24A:
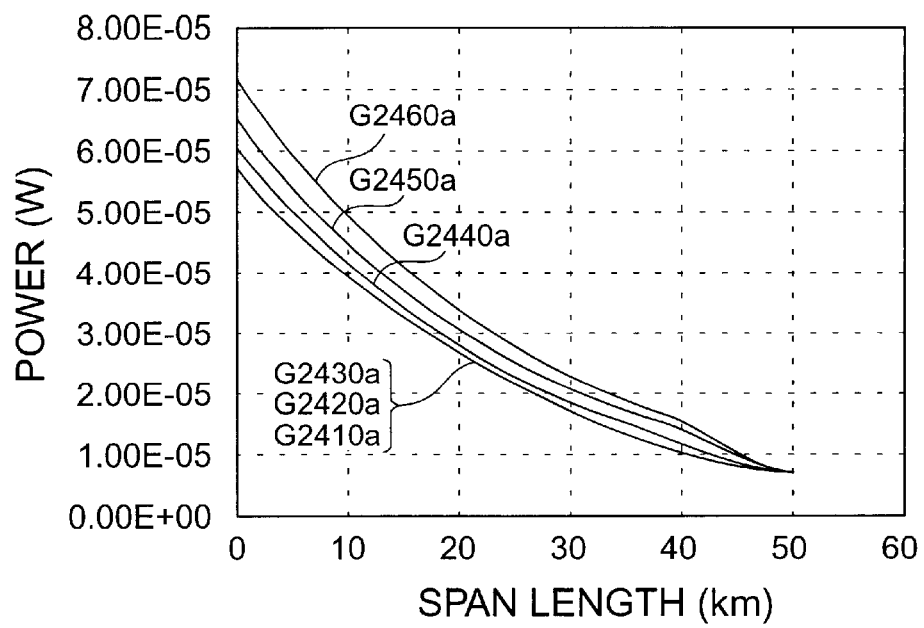
FIGS. 24A and 24B are graphs showing the power attenuation and phase shift amount versus signal propagation length in various samples (optical transmission lines) having a span length of 50 km with no Raman amplifiers, respectively.
Figure 24B:
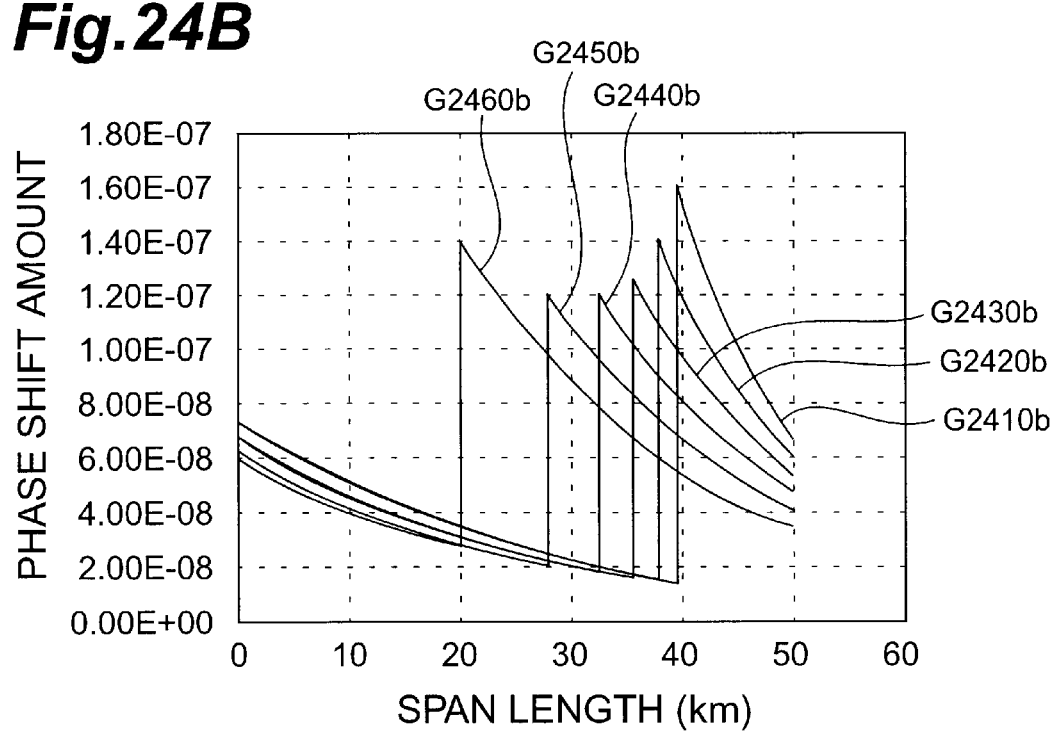
Figure 25A:
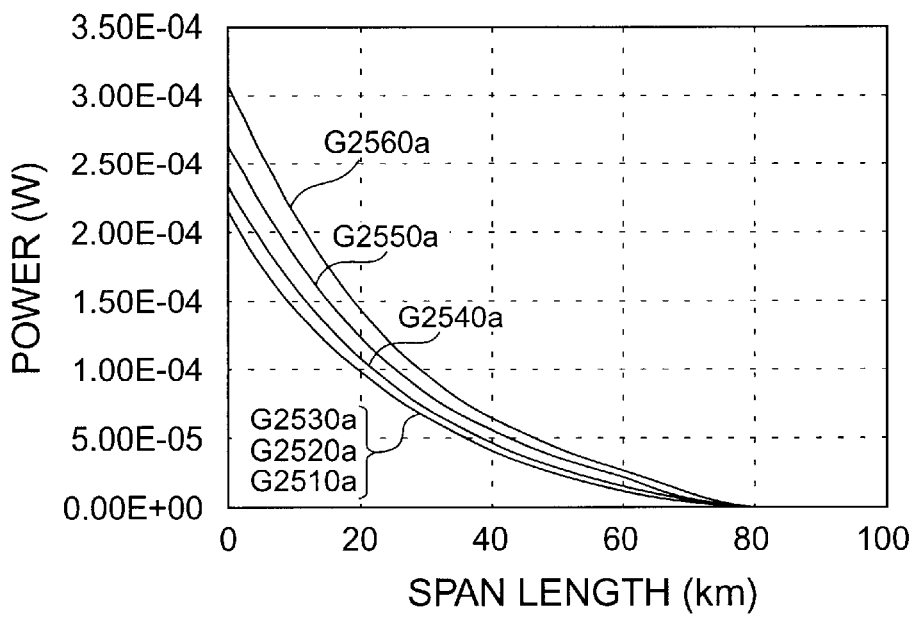
FIGS. 25A and 25B are graphs showing the power attenuation and phase shift amount versus signal propagation length in various samples (optical transmission lines) having a span length of 80 km with no Raman amplifiers, respectively.
Figure 25B:
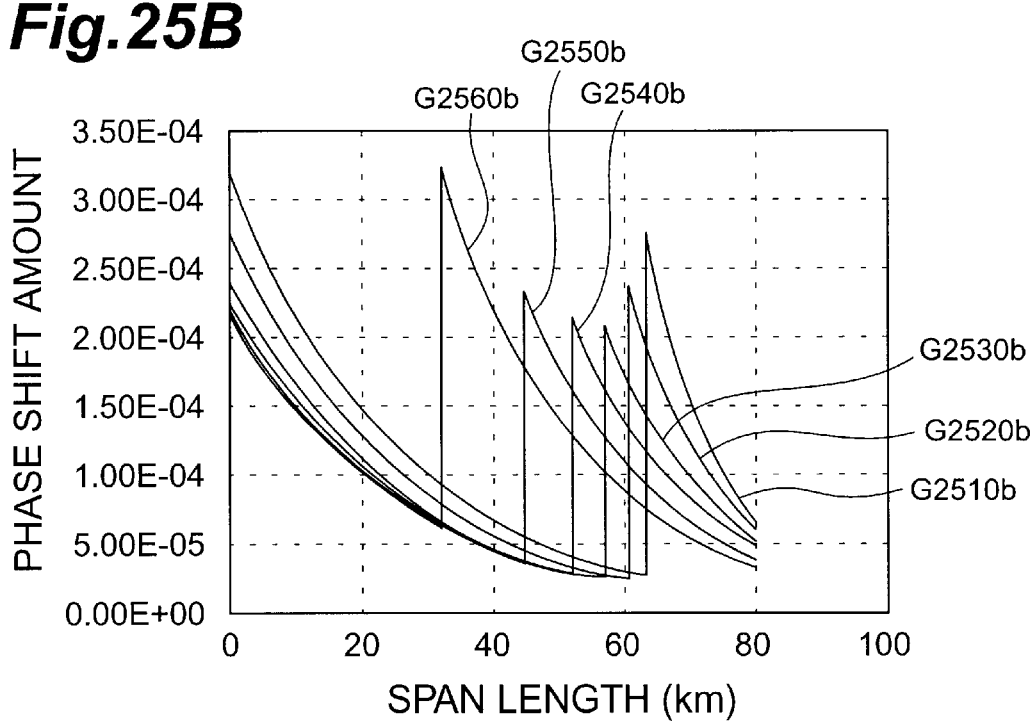
Figure 26A:
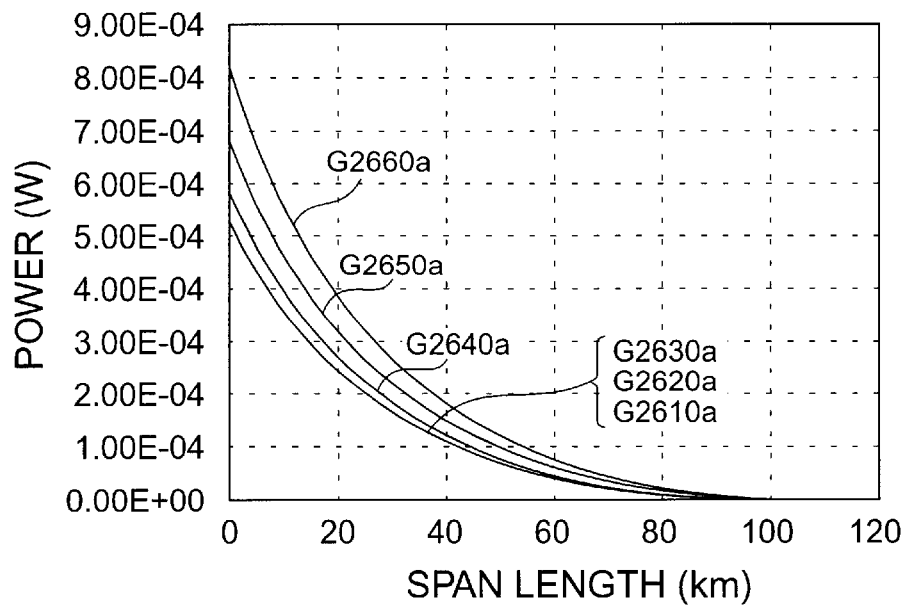
FIGS. 26A and 26B are graphs showing the power attenuation and phase shift amount versus signal propagation length in various samples (optical transmission lines) having a span length of 100 km with no Raman amplifiers, respectively.
Figure 26B:
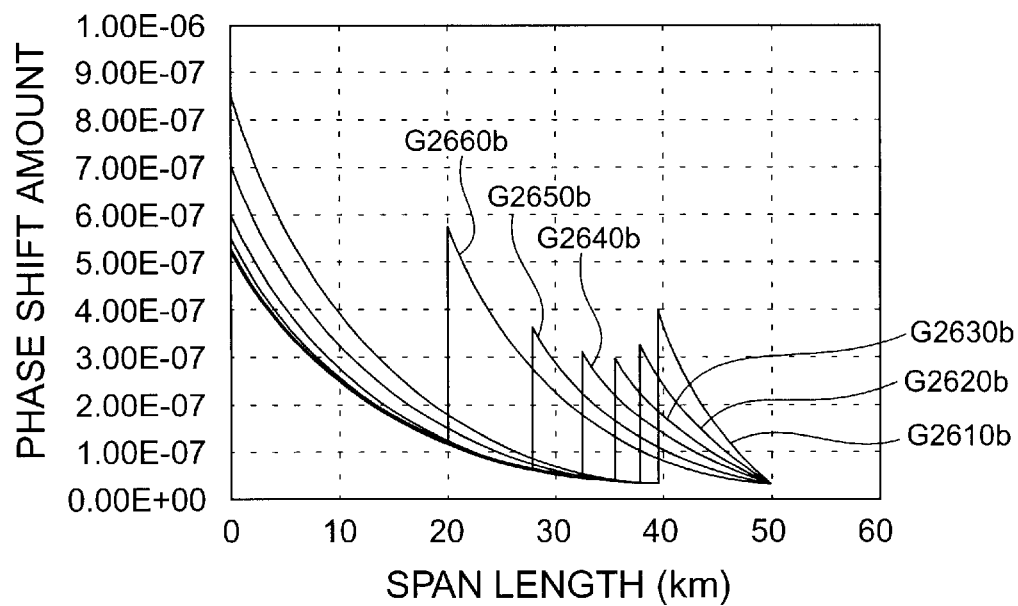

Also, the inventors calculated the power attenuation and phase shift amount versus signal transmission length in optical transmission lines in which no distributed Raman amplification is employed. FIGS. 24A and 24B are graphs showing the power attenuation and phase shift amount versus signal propagation length in various samples (optical transmission lines) having a span length of 50 km in which no Raman amplification is employed, respectively. FIGS. 25A and 25B are graphs showing the power attenuation and phase shift amount versus signal propagation length in various samples (optical transmission lines) having a span length of 80 km in which no Raman amplification is employed, respectively. FIGS. 26A and 26B are graphs showing the power attenuation and phase shift amount versus signal propagation length in various samples (optical transmission lines) having a span length of 100 km in which no Raman amplification is employed, respectively. In each of the cases with span lengths of 50 km, 80 km, and 100 km, the output power from the optical transmission line was fixed at −22 dBm, whereas an optical transmission line in which the SMF and DCF4 having the characteristics shown in FIG. 27 were fusion-spliced to each other, an optical transmission line in which the SMF and DCF5 having the characteristics shown in FIG. 27 were fusion-spliced to each other, an optical transmission line in which the SMF and DCF6 having the characteristics shown in FIG. 27 were fusion-spliced to each other, an optical transmission line in which the SMF and DCF7 having the characteristics shown in FIG. 27 were fusion-spliced to each other, an optical transmission line in which the SMF and DCF8 having the characteristics shown in FIG. 27 were fusion-spliced to each other, and an optical transmission line in which the SMF and DCF9 having the characteristics shown in FIG. 27 were fusion-spliced to each other were prepared as twenty-fifth, twenty-sixth, twenty-seventh, twenty-eighth, twenty-ninth, and thirtieth samples, respectively. In each of the twenty-fourth to thirtieth samples, the dispersion compensation ratio by DCF is 100%, and the bending loss at a bending diameter of 20 mm is 10 dB/m.

In FIGS. 24A and 24B, curves G2410$a$ and G2410$b$, curves G2420$a$ and G2420$b$, curves G2430$a$ and G2430$b$, curves G2440$a$ and G2440$b$, curves G2450$a$ and G2450$b$, and curves G2460$a$ and G2460$b$ are those concerning the twenty-fifth, twenty-sixth, twenty-seventh, twenty-eighth, twenty-ninth, and thirtieth samples, respectively. In FIGS. 25A and 25B, curves G2510$a$ and G2510$b$, curves G2520$a$ and G2520$b$, curves G2530$a$ and G2530$b$, curves G2540$a$ and G2540$b$, curves G2550$a$ and G2550$b$, and curves G2560$a$ and G2560$b$ are those concerning the twenty-fifth, twenty-sixth, twenty-seventh, twenty-eighth, twenty-ninth, and thirtieth samples, respectively. In FIGS. 26A and 26B, curves G2610$a$ and G2610$b$, curves G2620$a$ and G2620$b$, curves G2630$a$ and G2630$b$, curves G2640$a$ and G2640$b$, curves G2650$a$ and G2650$b$, and curves G2660$a$ and G2660$b$ are those concerning the twenty-fifth, twenty-sixth, twenty-seventh, twenty-eighth, twenty-ninth, and thirtieth samples, respectively.

Figure 28:
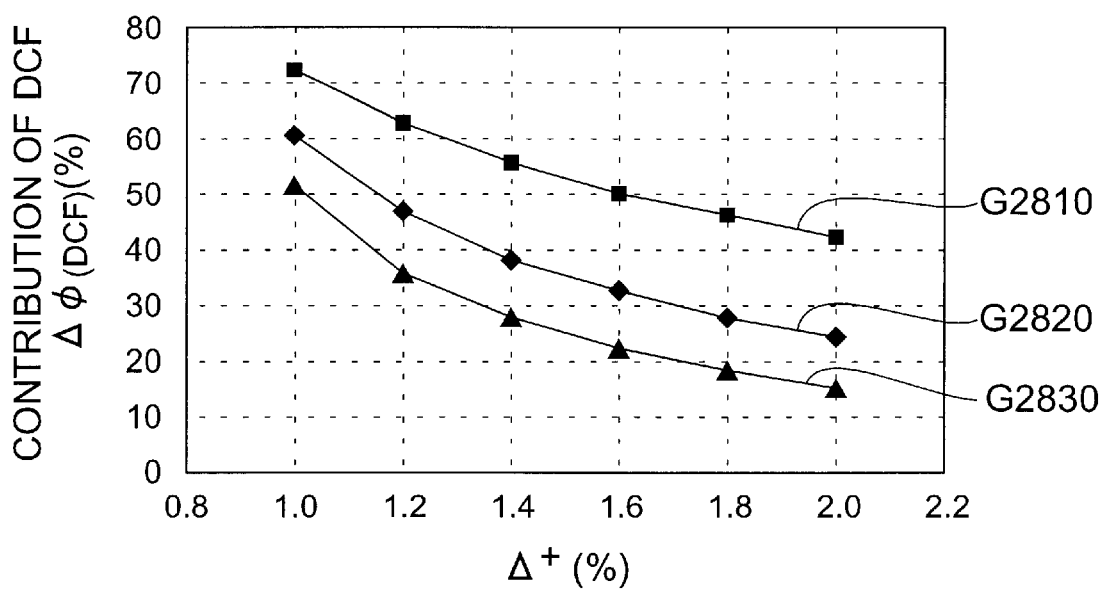
FIG. 28 is a graph showing the relationship between the contribution ratio of DCF to the nonlinearity index Δφ and the relative refractive index difference Δ⁺ of the DCF in each of the optical transmission lines having respective span lengths of 50 km, 80 km, and 100 km.

As shown in FIGS. 24B, 25B, and 26B in particular, the contribution of SMF becomes greater than that of DCF as the span length elongates. For making it easier to see this result, FIG. 28 shows the relationship between the contribution of DCF to the nonlinearity index $\Delta\phi$ and the relative refractive index difference $\Delta^+$ of the DCF in each of the optical transmission lines having respective span lengths of 50 km, 80 km, and 100 km. As can be seen from this graph, the contribution of DCF reduces as the span length elongates. Namely, as the span length elongates, the contribution of SMF inherently having a low nonlinearity increases, whereby the equivalent effective area $EA_{eff}$ (indicative of relative nonlinearity with respect to DSF (assuming a Non-Zero Dispersion-Shifted Optical Fiber) in the optical transmission line as a whole increases. In FIG. 28, curves G2810, G2820, and G2830 indicate results of calculation concerning the optical transmission lines having span lengths of 50 km, 80 km, and 100 km, respectively.

Figure 29A:
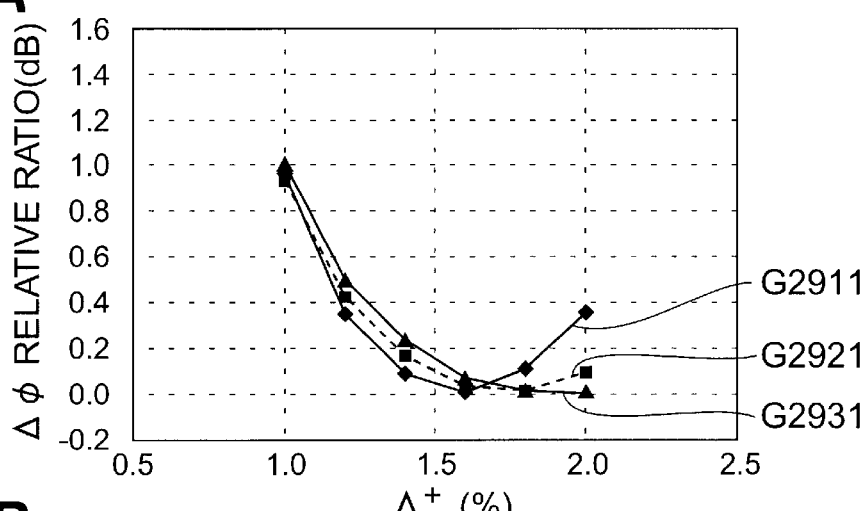
FIGS. 29A to 29C are graphs showing the relationships between Δφ relative value and Δ⁺ of DCF at each standard in the optical transmission lines having respective span lengths of 50 km, 80km, and 100 km when the gain by Raman amplification is fixed.
Figure 29B:
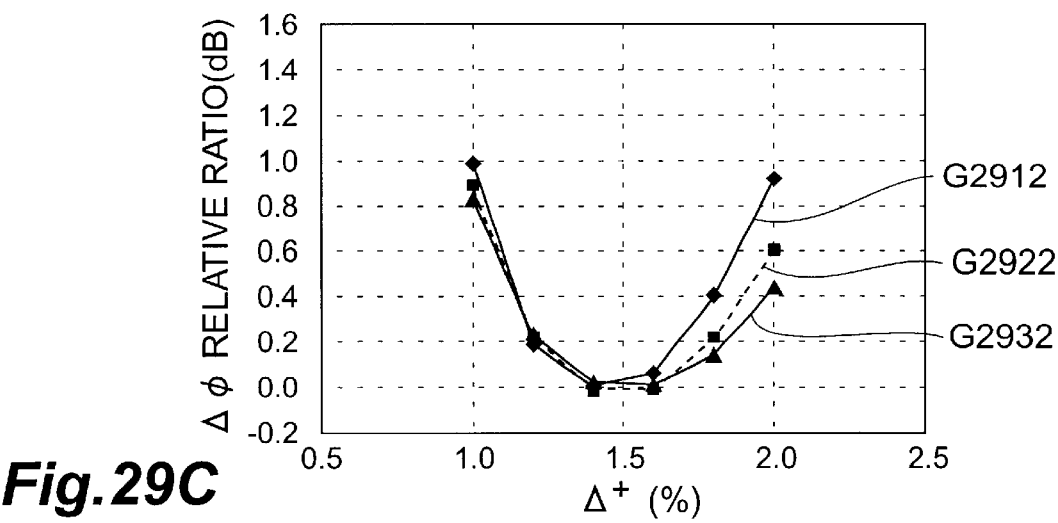
Figure 29C:
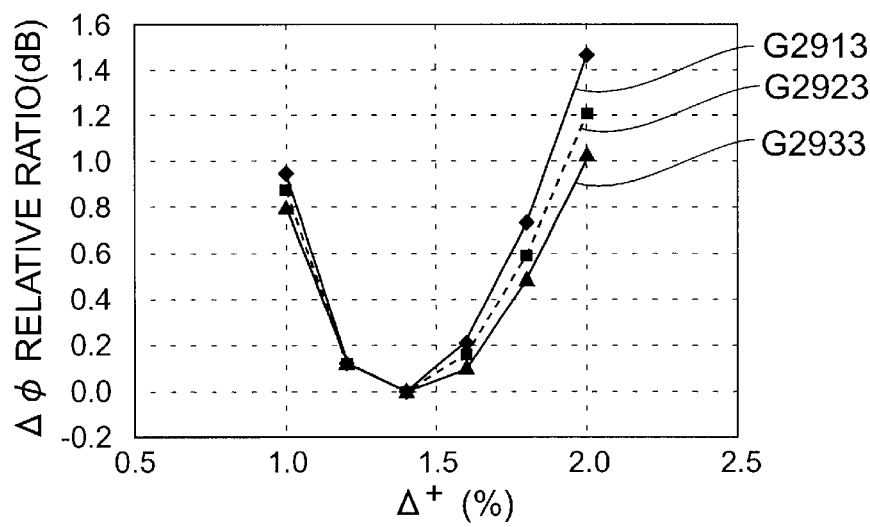

The optimal $\Delta^+$ in DCF upon changing the span length will now be explained. FIGS. 29A, 29B, and 29C are graphs showing the relationships between $\Delta\phi$ relative value and $\Delta^+$ of DCF at each standard in the optical transmission lines having respective span lengths of 50 km, 80 km, and 100 km when the gain by Raman amplification is fixed. In FIGS. 29A to 29C, curves G2911, G2912, and G2913; curves G2921, G2922, and G2923; and curves G2931, G2932, and G2933 indicate results of calculation when Raman gain is 0 dB, 7 dB, and 10 dB, respectively. The ordinate of each graph is the $\Delta\phi$ relative ratio (yielding the lowest nonlinearity when minimized) defined by the following expression (8):

$$\Delta\phi\text{relative ratio}=10\log(\Delta\phi/\Delta\phi\text{max}) \qquad (8)$$

The optimal $\Delta^+$ (at which the $\Delta\phi$ relative ratio is minimized) of DCF at a span length of 50 km is 1.6% from FIG. 29A, the optimal $\Delta^+$ of DCF at a span length of 80 km is 1.5% from FIG. 29B, and the optimal $\Delta^+$ of DCF at a span length of 100 km is 1.4% from FIG. 29C, whereby it is seen that the optimal $\Delta^+$ decreases as the span length is longer (the optimal $\Delta^+$ depends on distance) regardless of whether Raman amplification exists or not. From these results, when the span length becomes longer, the optimal $\Delta^+$ is 1.4±0.2% if the fluctuation range is 10% or less, i.e., if the $\Delta\phi$ relative ratio is 0.4 dB or less, and preferably 1.4±0.1% if the fluctuation range is 5% or less, i.e., if the $\Delta\phi$ relative ratio is 0.2 dB or less. These results are applicable not only to optical transmission lines in which a DCF having a W-shaped refractive index profile such as the one shown in FIGS. 6A and 6B is employed, but also to those in which a DCF having an increased number of cladding regions, e.g., a triple or quadruple cladding type refractive index profile, is employed.

Next, the following explains characteristics of each of thirty-first to forty-sixth samples of the optical transmission line according to the present invention.

FIG. 30 is a table showing characteristics at a wavelength of 1550 nm of an $A_{eff}$-enlarged PSCF employed as the SMF of each of thirty-first to forty-sixth samples of the optical transmission line according to the present invention. The $A_{eff}$-enlarged PSCF to be employed has a non-intentionally doped core region and has, as characteristics at the wavelength of 1550 nm, a chromatic dispersion of 20.4 ps/nm/km, a dispersion slope of 0.060 ps/nm$^2$/km, a transmission loss of 0.170 dB/km, an effective area $A_{eff}$ of 110 $\mu$m$^2$, and a nonlinear refractive index N2 of 2.8×10$^{-20}$ m$^2$/W.

Also, FIG. 31 is a table showing characteristics at a wavelength of 1550 nm of samples (DCF10–DCF25) of a dispersion compensating Fiber employed to the optical transmission line according to the present invention. FIG. 31 shows, regarding to DCF10 to DCF25, chromatic dispersion (ps/nm/km), dispersion slope (ps/nm$^2$/km), transmission loss (dB/km), effective area $A_{eff}$ ($\mu$m$^2$), nonlinear refractive index N2 (×10$^{-20}$ m$^2$/W), and bending loss (dB/m), successively from the left side. Of the dispersion compensating fibers of DCF10 to DCF 25, DCF10 to DCF13 are included in a first group with the effective area $A_{eff}$ of 23 $\mu$m$^2$, DCF14 to DCF17 are included in a second group with the effective area $A_{eff}$ of 25 $\mu$m$^2$, DCF18 to DCF21 are included in the third group with the effective area $A_{eff}$ of 31 $\mu$m$^2$, and DCF22 to DCF25 are included in a fourth group with the effective area $A_{eff}$ of 33 $\mu$m$^2$.

Further, FIG. 32 is a table showing characteristics at a wavelength of 1550 nm of each of thirty-first to forty-sixth samples of the optical transmission line according to the present invention. Each of the thirty-first to forty-sixth samples of the optical transmission line according to the present invention comprise the associated one of DCFs fusion-spliced to $A_{eff}$-enlarged PSCF, respectively. In other words, the thirty-first to thirty-fourth samples respectively comprise the associated one of DCF10 to DCF13 (including first group) having the effective area $A_{eff}$ of 23 $\mu m^2$ and the $A_{eff}$-enlarged PSCF, the thirty-fifth to thirty-eighth samples respectively comprise the associated one of DCF14 to DCF17 (including second group) having the effective area $A_{eff}$ of 25 $\mu m^2$ and the $A_{eff}$-enlarged PSCF, the thirty-ninth to forty-second samples respectively comprise the associated one of DCF18 to DCF21 (including third group) having the effective area $A_{eff}$ of 31 $\mu m^2$ and the $A_{eff}$-enlarged PSCF, and the forty-third to forty-sixth samples respectively comprise the associated one of DCF22 to DCF25 (including fourth group) having the effective area $A_{eff}$ of 33 $\mu m^2$ and the $A_{eff}$-enlarged PSCF. FIG. 32 shows, regarding to thirty-first to forty-sixth samples, average chromatic dispersion (ps/nm/km), average dispersion slope (ps/nm$^2$/km), equivalent effective area $EA_{eff}$ ($\mu m^2$), SMF length (km), and DCF length (km), successively from the left side. Each of the samples has a span length of 50 km.

Figure 33:
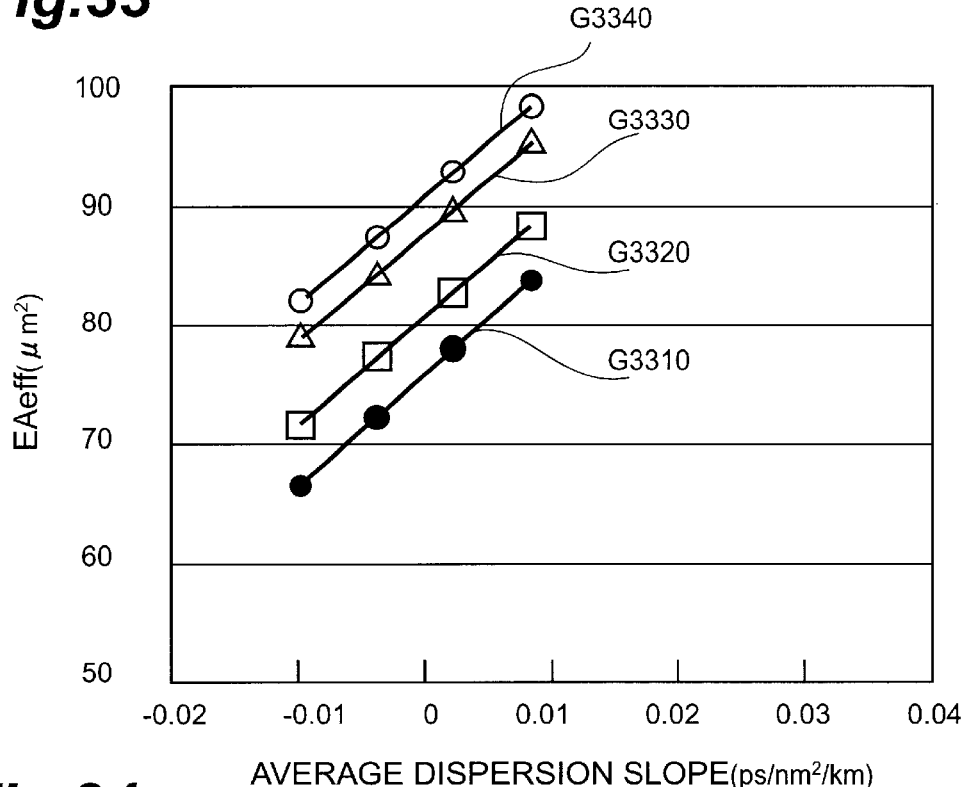
FIG. 33 is a graph showing relationships between the average dispersion slope $S_{ave}$ and equivalent effective area $EA_{\mathit{eff}}$ in thirty-first to forty-sixth samples of the optical transmission line according to the present invention.

The graph showing relationships between the average dispersion slope $S_{ave}$ and equivalent effective area $EA_{eff}$ in thirty-first to forty-sixth samples is shown in FIG. 33. In FIG. 33, a curve G3310 shows thirty-first to thirty-fourth samples respectively including DCF10 to DCF13 (each having $A_{eff}$ 23 $\mu m^2$), a curve G3320 shows thirty-fifth to thirty-eighth samples respectively including DCF14 to DCF17 (each having $A_{eff}$ 25 $\mu m^2$), a curve G3330 shows thirty-ninth to forty-second samples respectively including DCF18 to DCF21 (each having $A_{eff}$ 31 $\mu m^2$), and a curve G3330 shows forty-third to forty-sixth samples respectively including DCF22 to DCF25 (each having $A_{eff}$ 33 $\mu m^2$)

The curve G3310 of FIG. 33 corresponds to the lower limit $f(S_{ave})$ of equivalent effective area $EA_{eff}$, and the curve G3340 of FIG. 33 also corresponds to the upper limit $g(S_{ave})$ of equivalent effective area $EA_{eff}$. By respectively fitting the curves 3310 and 3330 to linear functions, the curves 3310 and 3330 can be defined as the following expressions (9) and (10):

$$EA_{eff} = 941.64 \times S_{ave} + 76.168 \quad (9)$$

$$EA_{eff} = 885.48 \times S_{ave} + 91.208 \quad (10)$$

Figure 34:
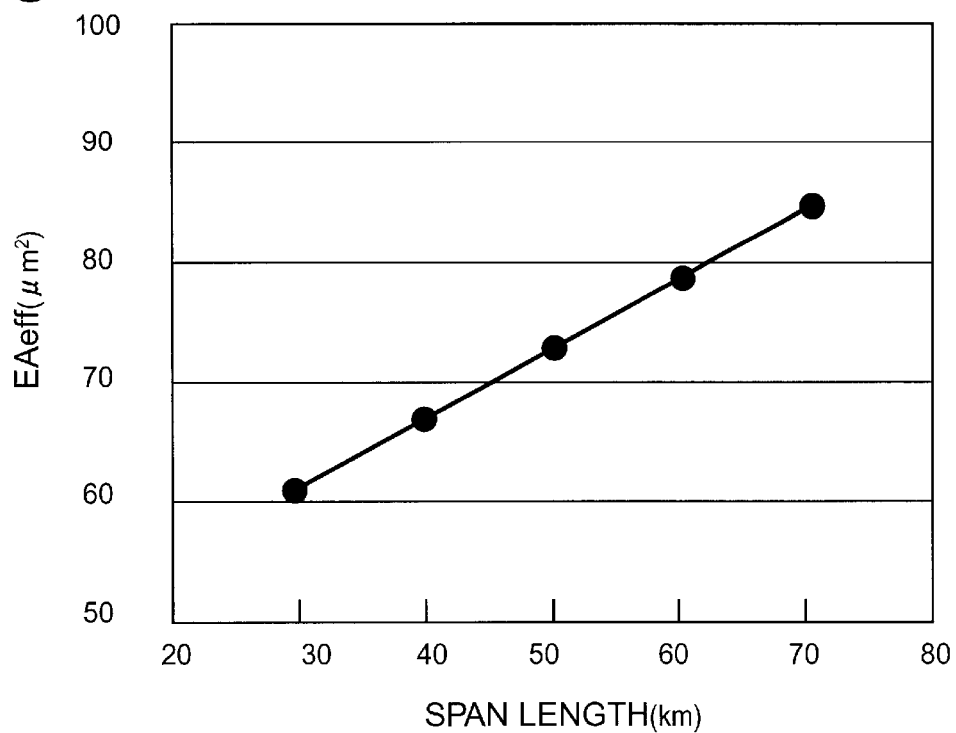
FIG. 34 is a graph showing the relationship between span length (km) and equivalent effective area $EA_{\mathit{eff}}$, regarding to thirty-first to forty-sixth samples of the optical transmission line according to the present invention.

On the other hand, FIG. 34 is a graph showing the relationship between span length L (km) and equivalent effective area $EA_{eff}$, regarding to thirty-first to forty-sixth samples of the optical transmission line according to the present invention. The curve of FIG. 34 shows a span length dependency of equivalent effective area $EA_{eff}$, and the linear fitting function of the curve can be defined as the following expression (11):

$$EA_{eff} = 0.6093 \times L + 42.026 \quad (11)$$

The above expressions (9) and (10) are obtained at the condition while the span length L of each sample in FIG. 33 is 50 km. That is, the lower limit $f(S_{ave})$ can be defined as the following expression (12):

$$f(S_{ave}) = 942 \times S_{ave} + 76.168 + 0.6093 \times (L-50) = 942 \times S_{ave} + 0.609 \times L + 45.7 \quad (12)$$

while using the average dispersion slope $S_{ave}$ and the span length L as variable.

Additionally, the upper limit $g(S_{ave})$ can be defined as the following expression (13):

$$g(S_{ave}) = 885.48 \times S_{ave} + 91.208 + 0.6093 \times (L-50) = 885 \times S_{ave} + 0.609 \times L + 60.7 \quad (13)$$

while using the average dispersion slope $S_{ave}$ and the span length L as variable.

As described above, on thirty-first to forty-six samples of the optical transmission line according to the present invention, the lower limit $f(S_{ave})$ and the upper limit $g(S_{ave})$ of the equivalent effective area $EA_{eff}$ are respectively defined by the above-mentioned expressions (12) and (13).

As in the foregoing, employed as a repeated transmission line according to the present invention is an optical transmission line having a structure in which a single-mode optical fiber and a dispersion-compensating optical fiber are fusion-spliced to each other and exhibiting, as characteristics at the wavelength of 1550 nm, an average dispersion slope $S_{ave}$ of $-0.0113$ ps/nm$^2$/km or more but 0.0256 ps/nm$^2$/km or less, and an equivalent effective area $EA_{eff}$ of 50 $\mu m^2$ or more, wherein the average dispersion slope $S_{ave}$ and the equivalent effective area $EA_{eff}$ are designed so as to satisfy a predetermined condition such that the bending loss becomes 2 dB/m or more but 10 dB/m or less. As a consequence, both the nonlinearity and average dispersion slope of the optical transmission line are lowered, which enables high-speed, large-capacity WDM transmissions at a high bit rate (10 Gbits/s) over a wide wavelength band (e.g., from 1530 nm to 1600 nm).

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical transmission line for a repeatered transmission line having a span length of L disposed between stations, said optical transmission line comprising a single-mode optical fiber and a dispersion-compensating optical fiber, said single-mode optical fiber having a zero-dispersion wavelength in a 1.3-$\mu$m wavelength band, said dispersion-compensating optical fiber being disposed at a position where signals outputted from said single-mode optical fiber reach and compensating for a chromatic dispersion of said single-mode optical fiber;

said optical transmission line as a whole having an average dispersion slope $S_{ave}$ of $-0.0113$ ps/nm$^2$/km or more but 0.0256 ps/nm$^2$/km or less at a wavelength of 1550 nm, and an equivalent effective area $EA_{eff}$ of 50 $\mu m^2$ or more at the wavelength of 1550 nm;

said average dispersion slope $S_{ave}$ and said equivalent effective area $EA_{eff}$ satisfying the relationship of:

$$f(S_{ave}) \leq EA_{eff} \leq g(S_{ave})$$

where $f(S_{ave})$ is a lower limit function which yields the lower limit of $EA_{eff}$ by the expression:

$$942 \times S_{ave} + 0.609 \times L + 45.7$$

while using the average dispersion slope $S_{ave}$ and the span length L as variable, and $g(S_{ave})$ is an upper limit function which yields the upper limit of $EA_{eff}$ by the expression:

$$885 \times S_{ave} + 0.609 \times L + 60.7$$

while using the average dispersion slope $S_{ave}$ and the span length L as variable.

2. An optical transmission line according to claim 1, wherein said optical transmission line as a whole has an average transmission loss of 0.185 dB/km or more but 0.210 dB/km or less at the wavelength of 1550 nm.

3. An optical transmission line according to claim 1, wherein said optical transmission line as a whole has an average transmission loss of 0.185 dB/km or more but 0.220 dB/km or less within the wavelength band from 1530 nm to 1600 nm.

4. An optical transmission line according to claim 1, wherein said single-mode optical fiber has an effective area of 100 $\mu m^2$ or more at the wavelength of 1550 nm.

5. An optical transmission line according to claim 1, wherein said optical transmission line as a whole has a negative average chromatic dispersion at the wavelength of 1550 nm.

6. An optical transmission system including a plurality of stations, wherein the optical transmission line according to claim 1 is employed as at least one of repeatered transmission lines disposed between said stations.

7. An optical transmission system including, at least, a transmitting station, one or more repeater stations, and a receiving station, wherein the optical transmission line according to claim 6 is employed as a plurality of repeatered transmission lines adjacent each other among repeatered transmission lines disposed between said stations; and wherein an optical transmission line made of said single-mode optical fiber alone is employed as a repeatered transmission line subsequent to said repeatered transmission lines each having the optical transmission line according to claim 6 employed therein.

8. An optical transmission system including a plurality of stations, wherein the optical transmission line according to claim 1 is employed as at least one of repeatered transmission lines disposed between said stations, at least one of said stations including a Raman amplifier.

* * * * *